(12) United States Patent
Perron

(10) Patent No.: US 9,773,173 B2
(45) Date of Patent: Sep. 26, 2017

(54) METHOD AND SYSTEM FOR USE IN PERFORMING SECURITY SCREENING

(71) Applicant: OPTOSECURITY INC., Quebec (CA)

(72) Inventor: Luc Perron, Quebec (CA)

(73) Assignee: Optosecurity Inc., Quebec (CA)

( * ) Notice: Subject to any disclaimer, the term of this patent is extended or adjusted under 35 U.S.C. 154(b) by 0 days.

(21) Appl. No.: 14/638,736

(22) Filed: Mar. 4, 2015

(65) Prior Publication Data

US 2015/0186732 A1 Jul. 2, 2015

Related U.S. Application Data

(63) Continuation of application No. 13/642,353, filed as application No. PCT/CA2011/000474 on Apr. 21, 2011, now Pat. No. 9,014,425.
(Continued)

(51) Int. Cl.
| | |
|---|---|
| *G06K 9/00* | (2006.01) |
| *G01V 5/00* | (2006.01) |
| *G06K 9/66* | (2006.01) |

(52) U.S. Cl.
CPC ....... *G06K 9/00771* (2013.01); *G01V 5/0016* (2013.01); *G06K 9/66* (2013.01)

(58) Field of Classification Search
None
See application file for complete search history.

(56) References Cited

U.S. PATENT DOCUMENTS

| | | |
|---|---|---|
| 5,182,764 A | 1/1993 | Peschmann et al. |
| 5,974,111 A | 10/1999 | Krug et al. |
| | (Continued) | |

FOREIGN PATENT DOCUMENTS

| | | |
|---|---|---|
| CA | 2678233 | 8/2008 |
| EP | 2364912 | 9/2011 |
| | (Continued) | |

OTHER PUBLICATIONS

European Search Report issued on Jun. 8, 2015 in connection with European Patent Application No. 15160038.4—7 pages.
(Continued)

*Primary Examiner* — Hadi Akhavannik
(74) *Attorney, Agent, or Firm* — Sheridan Ross, PC

(57) ABSTRACT

A method and apparatus for screening luggage are provided. X-ray images derived by scanning the luggage with X-rays are received and processed with an automated threat detection (ATD) engine. A determination is then made whether to subject respective ones of the X-ray images to further visual inspection by a human operator at least in part based on results obtained by the ATD engine. In certain cases, visual inspection by a human operator is by-passed and the ATD results are relied upon in order to mark luggage for further inspection or to mark luggage as clear. In another aspect, X-ray images derived by scanning the luggage using two or more X-ray scanning devices are pooled at a centralized location. ATD operations are applied to the X-ray images, which are then provided "on-demand" to a human operator for visual inspection. Results of the visual inspection are entered by the human operator and then conveyed to on-site screening technicians associated with respective X-ray scanning devices.

10 Claims, 13 Drawing Sheets

Related U.S. Application Data

(60) Provisional application No. 61/326,503, filed on Apr. 21, 2010, provisional application No. 61/420,973, filed on Dec. 8, 2010.

(56) References Cited

U.S. PATENT DOCUMENTS

| | | | |
|---|---|---|---|
| 6,088,423 | A | 7/2000 | Krug et al. |
| 6,707,879 | B2 | 3/2004 | McClelland et al. |
| 6,721,391 | B2 | 4/2004 | McClelland et al. |
| 6,825,854 | B1 | 11/2004 | Beneke et al. |
| 6,837,095 | B2 | 1/2005 | Sunshine et al. |
| 6,839,403 | B1 | 1/2005 | Kotowski et al. |
| 6,915,954 | B2 | 7/2005 | Knowles et al. |
| 6,918,541 | B2 | 7/2005 | Knowles et al. |
| 7,012,256 | B1 | 3/2006 | Roos et al. |
| 7,020,242 | B2 | 3/2006 | Ellenbogen et al. |
| 7,139,406 | B2 | 11/2006 | McClelland et al. |
| 7,244,941 | B2 | 7/2007 | Roos et al. |
| 7,253,727 | B2 | 8/2007 | Jenkins et al. |
| 7,257,189 | B2 | 8/2007 | Modica et al. |
| 7,286,634 | B2 | 10/2007 | Sommer et al. |
| 7,457,394 | B2 | 11/2008 | Hartick et al. |
| 7,505,557 | B2 | 3/2009 | Modica et al. |
| 7,561,664 | B2 | 7/2009 | Teslyar et al. |
| 7,702,069 | B2 | 4/2010 | Panesar et al. |
| 7,705,731 | B2 | 4/2010 | Trammell, III |
| 7,720,194 | B2 | 5/2010 | Connelly et al. |
| 7,734,066 | B2 | 6/2010 | Delia et al. |
| 7,873,201 | B2 | 1/2011 | Eilbert et al. |
| 7,903,783 | B2 | 3/2011 | Modica et al. |
| 7,973,697 | B2 | 7/2011 | Reilly et al. |
| 8,031,903 | B2 | 10/2011 | Paresi et al. |
| 8,148,693 | B2 | 4/2012 | Ryge et al. |
| 8,165,267 | B2 | 4/2012 | Henkel |
| 8,199,996 | B2 | 6/2012 | Hughes |
| 8,498,376 | B2 | 7/2013 | Modica et al. |
| 8,899,404 | B2 | 12/2014 | Schoepe et al. |
| 2002/0176532 | A1 | 11/2002 | McClelland et al. |
| 2002/0186862 | A1 | 12/2002 | McClelland et al. |
| 2003/0023592 | A1 | 1/2003 | Modica et al. |
| 2003/0085163 | A1 | 5/2003 | Chan et al. |
| 2005/0008119 | A1 | 1/2005 | McClelland et al. |
| 2005/0024199 | A1 | 2/2005 | Huey et al. |
| 2005/0031076 | A1 | 2/2005 | McClelland et al. |
| 2005/0057354 | A1 | 3/2005 | Jenkins et al. |
| 2005/0058242 | A1 | 3/2005 | Peschmann |
| 2005/0198226 | A1 | 9/2005 | Delia et al. |
| 2006/0115109 | A1 | 6/2006 | Whitson et al. |
| 2006/0140340 | A1 | 6/2006 | Kravis |
| 2006/0215811 | A1 | 9/2006 | Modica et al. |
| 2006/0243071 | A1 | 11/2006 | Sagi-Dolev |
| 2006/0274916 | A1 | 12/2006 | Chan et al. |
| 2007/0029165 | A1* | 2/2007 | Bender .............. B65G 47/648 198/358 |
| 2007/0195994 | A1 | 8/2007 | McClelland et al. |
| 2007/0217571 | A1 | 9/2007 | Teslyar et al. |
| 2007/0230656 | A1 | 10/2007 | Lowes et al. |
| 2007/0280502 | A1 | 12/2007 | Paresi et al. |
| 2008/0013819 | A1 | 1/2008 | Eilbert et al. |
| 2008/0044801 | A1 | 2/2008 | Modica et al. |
| 2008/0095396 | A1 | 4/2008 | Krug et al. |
| 2008/0240578 | A1 | 10/2008 | Gudmundson et al. |
| 2009/0034790 | A1 | 2/2009 | Song et al. |
| 2009/0231134 | A1 | 9/2009 | Modica et al. |
| 2009/0284343 | A1 | 11/2009 | Ambrefe, Jr. et al. |
| 2012/0093367 | A1* | 4/2012 | Gudmundson ...... G01N 23/046 382/103 |
| 2012/0300902 | A1 | 11/2012 | Modica et al. |
| 2013/0034268 | A1 | 2/2013 | Perron |
| 2015/0154876 | A1 | 6/2015 | Modica et al. |
| 2016/0232769 | A1 | 8/2016 | Jarvi et al. |

FOREIGN PATENT DOCUMENTS

| | | |
|---|---|---|
| WO | 02082290 | 10/2002 |
| WO | 02082372 | 10/2002 |
| WO | 03029844 | 4/2003 |
| WO | WO 03/029844 | 4/2003 |
| WO | 2006052674 | 5/2004 |
| WO | 2005050405 | 6/2005 |
| WO | 2006015381 | 2/2006 |
| WO | 2006053113 | 5/2006 |
| WO | 2007035359 | 3/2007 |
| WO | 2009023314 | 2/2009 |
| WO | 2016086135 | 6/2016 |

OTHER PUBLICATIONS

International Search Report issued by the Canadian Intellectual Property Office in connection International Patent Application No. PCT/CA2011/000474, mailed Aug. 3, 2011, 6 pages.
Written Opinion of the International Searching Authority issued by the Canadian Intellectual Property Office in connection with International Patent Application No. PCT/CA2011/000474, mailed Aug. 3, 2011, 7 pages.
Office Action in connection with U.S. Appl. No. 13/642,353, mailed Jul. 2014, 6 pages.
Notice of Allowance in connection with U.S. Appl. No. 13/642,353, mailed Dec. 23, 2014, 8 pages.
Examiner's Report issued on Feb. 4, 2016 in connection with Canadian patent application No. 2,796,809—3 pages.
Office Action issued on Jun. 2, 2016 in connection with European patent application No. 15160038.4—5 pages.
Search Report issued on Dec. 21, 2016 in connection with European patent application No. 11771450.1—3 pages.
Examiner's Report issued on Nov. 3, 2016 in connection with Canadian patent application No. 2,933,659—5 pages.
Examiner's Report issued on Jan. 11, 2017 in connection with Canadian patent application No. 2,933,659—4 pages.
Office Action issued on Jan. 2, 2017 in connection with EP patent application No. 15160038.4—3 pages.
Examiner's Report issued on Mar. 20, 2017 in connection with Canadian patent application No. 2,796,809—4 pages.
Examiner's Report dated May 10, 2017 in connection with Canadian patent application No. 2,933,659—4 pages.
Office Action dated May 29, 2017 in connection with EP Patent Application No. 15160038.4—4 pages.

* cited by examiner

METHOD AND SYSTEM FOR USE IN PERFORMING SECURITY SCREENING

CROSS-REFERENCE TO RELATED APPLICATIONS

For the purpose of the United States, the present application claims the benefit of priority under 35 USC §119(e) based on:

U.S. provisional patent application Ser. No. 61/326,503 filed on Apr. 21, 2010 by Luc Perron; and U.S. provisional patent application Ser. No. 61/420,973 filed on Dec. 8, 2011 by Luc Perron.

The present application is also a continuation application claiming de benefit of priority under 35 U.S.C. §120 based on U.S. patent application Ser. No. 13/642,353 filed on Oct. 19, 2012 which was a national phase entry application under 35 USC 371 of International PCT Patent Application No. PCT/CA2011/000474 filed on Apr. 21, 2011.

The contents of the above-referenced patent documents are incorporated herein by reference.

FIELD OF THE INVENTION

The present invention relates generally to security systems and, more particularly, to a security screening system for assisting screening operators in the detection of potential threats in receptacles, in particular carry-on luggage, and to a method and/or apparatus for improving the efficiency of security screening processes at security checkpoints.

BACKGROUND

Security in airports, train stations, ports, mail sorting facilities, office buildings and other public and/or private venues is becoming increasingly important, particularly in light of recent violent events.

Typically, checkpoint security-screening systems make use of scanning devices (such as X-ray scanning devices) that use penetrating radiation to scan individual pieces of luggage (or other objects). Such scanning devices generally include a conveyor belt on which the pieces of luggage (or other objects) are positioned, either directly or on a support such as a tray. The conveyor belt displaces the objects positioned thereon towards an inspection area, also referred to as the scanning tunnel, where the objects are subjected to penetrating radiation. The scanning devices typically generate images (X-ray images in the case of an X-ray scanning device) that convey information related to the contents of the pieces luggage. Each scanning device includes a display device connected thereto on which images are rendered. A human operator visually inspects the images in order to determine whether there could be any potentially threatening objects located in the luggage. In conventional systems, a respective human operator is assigned to each scanning device in order to visually inspect the images that are generated. Typically that same operator also controls the movement of the conveyor belt of the scanning device. Once a piece of luggage has been screened by visually inspecting the image(s), the human operator typically identifies the piece of luggage either as being clear, in which case it can be collected by its owner, or by marking it for further inspection, in which case the piece is luggage is forwarded to secondary screening where additional security screening is performed (for example a manual inspection or other).

For each piece of luggage screened, there is an inherent delay associated with the piece of luggage being displaced on the conveyor belt. It has been observed that, for an average X-ray machine currently in use, it take approximately two (2) seconds to scroll an image of a piece of luggage on the display screen of a human operator. During that time the operator's time is essentially not used to visually inspect the image. Additional delays are incurred when the human operator needs additional time to be able to satisfy himself/herself that there are not prohibited objects in the piece of luggage. In such cases, the operator may temporary stop the conveyor belt and/or have the conveyor belt operate in reverse so that the piece of luggage is rescanned by the scanning device.

At airports, the above issues are further being compounded by the increase in the number of individual items that need to be screened at the security checkpoints. Although security measures, such as taking a laptop out of a bag for screening, restricting the quantity of liquids and gels allowed in carry-on bags, and removing shoes, are all fairly reasonable risk mitigation strategies designed to make air travel safer, they resulted in a lot more individual items being scanned than in the past. More items to scan necessarily requires more time to process. The delays associated with the screening of objects at security checkpoints can be significant and contribute to increase the level of frustration of travellers. In busy airports, it is now not uncommon to recommend that passengers arrive several hours (often two or three hours) prior to the scheduled departure time of their flight.

One of the approaches that can assist in countering the effects of these delays at security checkpoints is the use of automated threat detection (ATD). Generally ATD work in tandem with the scanning devices. Typically, when ATD functionality is provided, each scanning device is provided with ATD functionality for processing the images generated by subjecting pieces of luggage (or other objects) to penetrating radiation in order to identify regions of interests in the images (e.g. regions potential containing threats). If a region of interest is identified in an image, the image displayed to the human operator on the display screen associated with the scanning device is typically annotated by the ATD system to direct the attention of the human operator to the region of interest, for example by highlighting the region of interest in the image.

Although the use of automated threat detection (ATD) in principle allows a reduction in the delays associated with an operator examining an image of individual pieces of luggage, it does not address delays associated with the pieces of luggage being displaced on the conveyor belt. This approach also does not counter the effects of the increase in the number of additional objects that need to be individually screened to satisfy new security regulations.

Another approach used to accounts for the effects of these delays at security checkpoints is to provide multiple scanning devices in order to be able to process multiple passengers, or crew members, in parallel. While multiple scanning devices in use at the same time is advantageous from the perspective of being able to screen a large number of individuals relatively quickly, it increases the number of operators required to man the checkpoints thereby resulting in higher costs for the airports and/or security agency responsible for staffing these checkpoints. With every new security screening requirement, screening costs are continuously on the rise despite the best efforts from airport authorities.

In view of the above, there is a need in the industry for providing an improved security checkpoint screening system that addresses at least some of the deficiencies of existing screening systems.

SUMMARY

In accordance with a first broad aspect, the invention provides a method for screening pieces of luggage. The method comprises receiving X-ray images derived by scanning the pieces of luggage with X-rays. The method also comprises processing the X-ray images with an automated threat detection engine and determining whether to subject respective ones of the X-ray images to a visual inspection by a human operator at least in part based on results obtained by the automated threat detection engine.

In a specific implementation, the method also comprises by-passing visual inspection of at least some of the X-ray images at least in part based on the results obtained by the automated threat detection engine.

Advantageously, by-passing visual inspection by human operators of certain X-ray images reduces the amount of time human operators need to spend screening X-ray images thereby resulting in improvements in efficiency for the screening of pieces of luggage. For example, instead of systematically dispatching all X-ray images (with or without automated detection results) for visual inspection, the dispatch for visual inspection can be made in a selective manner. By using results obtained by the automated threat detection engine when determining whether to submit an X-ray image to a visual inspection by a human, a level of quality of the security screening can be maintained while achieving improved efficiency.

In a first non-limiting example, if the automated threat detection engine determines with a high level of confidence that an X-ray image contains a threat, it is likely that the human operator based on a visual inspection of the X-ray image would mark the piece of luggage for further inspection. Thus the visual inspection of that image can be skipped (by-passed) and the results obtained by the automated threat detection engine relied upon without affecting the quality of the screening process.

In a second non-limiting example, which may be used concurrently with or separately from the first non-limiting example, if the automated threat detection engine determines with a high level of confidence that an X-ray image depicts contents that are considered "safe" (the X-ray image is unlikely to contain a threat), it is likely that the human operator based on a visual inspection of the X-ray image would mark the image as "clear". Thus in this situation the visual inspection of that image can likely be skipped and the results obtained by the automated threat detection engine relied upon without affecting the quality of the screening process.

In accordance with a second broad aspect, the invention provides a method for screening pieces of luggage. The method comprises receiving X-rays image data derived by scanning the pieces of luggage with X-rays, the X-ray image data conveying images depicting the pieces of luggage. The method also comprises processing the images conveyed by the X-ray image data to identify candidate images for by-passing visual inspection at least in part based on results obtained by processing the X-ray image data with an automated threat detection engine. The method also comprises displaying on a display device at least some images conveyed by the X-ray image data for visual inspection by a human operator and by-passing visual inspection of at least some of the identified candidate images.

In a specific example of implementation, the images displayed for visual inspection convey to the human operator information derived at least in part based on the results obtained by processing the X-ray image data with the automated threat detection engine.

In a specific example of implementation, the method comprises assigning threat level indicators to pieces of luggage associated with the candidate images at least in part based on the results obtained by processing the X-ray image data with the automated threat detection engine. The method may also comprise assigning threat level indicators to pieces of luggage associated with images displayed for visual inspection at least in part based on results of the visual inspection. In a non-limiting example, the threat level indicators convey that associated pieces of luggage are either marked for further inspection or are marked as "clear".

In a specific implementation, the method comprises displaying information derived at least in part based on the threat level indicators to on-site screening technicians located in proximity to the scanned pieces of luggage.

In a non-limiting example of implementation, the assigned threat level indicators are used to control a displacement of the pieces of luggage through a security checkpoint.

In a first exemplary implementation, the control of the displacement of the pieces of luggage through a security checkpoint is exercised manually by an on-site screening technician. In such implementation, the information which is displays to the on-site screening technician indicates to the on-site screening technician that a piece of luggage should be directed to either to a luggage collection area (when the threat level indicator conveys that the piece of luggage is marked as clear) or to an area for dispatch to secondary screening (when the threat level indicator conveys that the piece of luggage is marked for further inspection).

In a second exemplary implementation, the control of the displacement of the pieces of luggage through a security checkpoint is exercised electronically. In such alternative implementation, the assigned threat level indicators is used to control switches in a conveyor system associated with the screening stations for directing the pieces of luggage either to a luggage collection area (when the threat level indicator conveys that the piece of luggage is marked as clear) or to an area for dispatch to secondary screening (the threat level indicator conveys that the piece of luggage is marked for further inspection).

In a specific example of implementation, the results obtained by the automated threat detection engine include information related to detection of potential threats in the pieces of luggage. In a non-limiting example of implementation, the method comprises identifying at least one of the images conveyed by the X-ray image data as a candidate image for by-passing visual inspection:

a) when the information derived by the automated threat detection engine conveys detection of a liquid product in an X-ray image. In such a situation, the method may comprise marking for further inspection the piece of luggage associated with the X-ray image; and/or b) when the information derived by the automated threat detection engine conveys detection of a threat in an X-ray image. In a non-limiting example, the detection of the threat in the X-ray image is associated with a confidence level exceeding a threshold confidence level that the X-ray image depicts a threat. In such a situation, the method may comprise marking for further inspection the piece of luggage associated with the X-ray image; and/or c) when the information derived by the automated threat detection engine conveys an indication of safe contents in an X-ray image. In a non-limiting example, the indication of safe contents in the X-ray image is associated with a confidence level exceeding a threshold confidence level. In such a situation, the method may comprise marking as clear the piece of luggage associated with the X-ray image.

In a specific example of implementation, the X-ray image data is derived by scanning the pieces of luggage using one or more X-ray scanning devices. The display device on which are displayed the images for visual inspection is located remotely from the one or more X-ray scanning device.

In an alternative example of implementation, the X-ray image data is derived by scanning the pieces of luggage using two or more X-ray scanning devices. In such alternative implementation, the display device on which are displayed the images for visual inspection is located remotely from the two or more X-ray scanning devices.

In accordance with another broad aspect, the invention provides a method for screening pieces of luggage. The method comprises scanning the pieces of luggage with X-rays to generate X-ray image data conveying images depicting the pieces of luggage. The method also comprises processing the images conveyed by the X-ray image data to identify candidate images for by-passing visual inspection at least in part based on results obtained by processing the X-ray image data with an automated threat detection engine. The method also comprises by-passing visual inspection of the identified candidate images and displaying on a display device images other than the candidate images for visual inspection by a human operator.

In accordance with another broad aspect, the invention provides a system for use in screening pieces of luggage. The system comprises at least one X-ray scanner for scanning the pieces of luggage with X-rays to derive X-ray image data. The system also comprises a computing device including an input for receiving the X-ray image data from the X-ray scanner. The computing device is programmed with software for screening the pieces of luggage in accordance with the above described method. The system also comprises a display module in communication with the computing device for conveying information derived by the computing device.

In a specific example of implementation, the system includes at least two X-ray scanners.

In accordance with another broad aspect, the invention provides an apparatus for use in screening pieces of luggage. The apparatus comprises an input for receiving X-ray image data derived by scanning the pieces of luggage with X-rays. The apparatus also comprises a processing element in communication with the input and programmed for screening pieces of luggage in accordance with the above described method. The apparatus also comprises an output for releasing data conveying results obtained by the processing element.

In accordance with another broad aspect, the invention provides a computer readable storage medium storing a program element for execution by a computing device. The program element, when executed by the computing device, causes the execution of a method by the computing device of the type described above for screening pieces of luggage.

In accordance with another broad aspect, the invention provides a method for screening pieces of luggage. The method comprises receiving at a centralized location X-ray images derived by scanning pieces of luggage using X-rays, the X-ray images being generated by at least two screening stations. The method also comprises using an automated threat detection engine to process the X-ray images by applying automated threat detection (ATD) operations. The method also comprises, in response to a request entered by a human operator at a remote screening station in communication with the centralized location:

i. releasing for display at the remote screening station an X-ray image on which an ATD operation has been applied, the X-ray image having been generated by one of the at least two screening stations;

ii. providing a user interface tool at the remote screening station for allowing the human operator to provide threat assessment information associated with the X-ray image being displayed;

iii. in response to receipt of threat assessment information from the human operator at the remote screening station, causing the threat assessment information to be conveyed to an on-site screening technician associated with the one of the at least two screening stations.

Advantageously, by pooling images generated by at least two (2) at least two screening stations in a centralized location and by making available for display these images to a human operator in response to a request, a reduction of at least some of the delays associated with the pieces of luggage being displaced on the conveyor belt can be achieved.

In accordance with a specific example of implementation, the X-ray image on which an ATD operation has been applied is a first X-ray image on which an ATD operation has been applied. In response to receipt of threat assessment information from the human operator at the remote screening station, a second X-ray image on which an ATD operation has been applied is released for display on the remote screening station. The second X-ray image may have been generated by the same screening station as the one that generated the first X-ray image of by a different screening station.

In a specific implementation, the X-ray image on which the ATD operation has been applied is conveyed to the on-site screening technician associated with the screening station that generated the X-ray image concurrently with the threat assessment information provided by the human operator at the remote screening station. In a non-limiting implementation, the threat assessment information provided by the human operator conveys a threat level indicator associated with the X-ray image being displayed. As examples, the threat level indicator may convey that the X-ray image being displayed is marked for further inspection or that the X-ray image being displayed is marked as clear.

In a non-limiting example of implementation, the threat assessment information provided by the human operator is used to control a displacement of a piece of luggage at the one of the at least two screening stations. In a first exemplary implementation, the control of the displacement of the piece of luggage is exercised manually by an on-site screening technician. In such implementation, the threat assessment information indicates to the on-site screening technician that a piece of luggage should be directed either to a luggage collection area (when the threat assessment information conveys that the piece of luggage is marked as clear) or to an area for dispatch to secondary screening (when the threat assessment information conveys that the piece of luggage is marked for further inspection). Alternatively, in a second exemplary implementation, the control of the displacement of the pieces of luggage may be exercised electronically. In such alternative implementation, the threat assessment information is used to control switches in a conveyor system associated with a screening station in order to direct the pieces of luggage either to a luggage collection area (when the threat assessment information conveys that the piece of luggage is marked as clear) or to an area for dispatch to secondary screening (when the threat assessment information conveys that the piece of luggage is marked for further inspection).

In a specific example of implementation, the X-ray image on which an ATD operation has been applied is displayed at the remote screening station concurrently with information conveying results obtained by the ATD operation.

In a specific example of implementation, the method comprises processing X-ray images on which ATD operations have been applied to identify candidate X-ray images for by-passing visual inspection at the remote screening station.

In a specific example of implementation, the method comprises, in response to identification of a candidate X-ray image for by-pass:

identifying which one of the at least two screening stations generated the identified candidate X-ray image;

by-passing visual inspection at the remote screening station of the candidate X-ray image; and causing threat assessment information derived based on results obtained by applying the ATD operation to the candidate X-ray image to be conveyed to an on-site screening technician associated with the screening station that generated the candidate X-ray image.

In a non-limiting example of implementation, identifying candidate X-ray images for by-passing visual inspection includes:

a) processing results obtained by applying ATD operations to the X-ray images; and b) identifying an X-ray image as a candidate X-ray images for by-passing visual inspection:

1. when the threat assessment information derived by applying an ATD operation to the X-ray image conveys detection of a threat in the X-ray image; and/or
2. when the threat assessment information derived by applying an ATD operation to the X-ray image conveys an indication of safe content in the X-ray image.

In accordance with a specific example, the X-ray image on which the ATD operation had been applied is associated with a piece of luggage being screened. The method comprises conveying a picture image of the piece of luggage being screened to the on-site screening technician associated with the screening station that generated the X-ray image concurrently with the threat assessment information.

In accordance with a non-limiting example of implementation, picture images of the pieces of luggage being screened are derived using a still-shot camera and/or using a video camera and displayed to the on-site screening technician. In a non-limiting implementation, the still-shot camera and/or video camera may be positioned either at the entrance or the exit of the X-ray devices to provide picture images of the pieces of luggage (or objects) under inspection.

Advantageously, providing picture images of the pieces of luggage being screened provides additional visual information to the on-site screening technician and facilitates the association of the pieces of luggage and threat assessment information by the on-site screening technician.

Optionally, a picture image of a piece of luggage may be displayed to the human operator at the remote screening station concurrently with the X-ray image of the piece of luggage on which an ATD operation has been applied. Since the human operator will be unlikely to have the benefit of seeing the physical piece of luggage prior to (or subsequent to) visual inspection, this picture image is intended to provide additional contextual information to the human operator at the remote screening station, which may influence results of the visual inspection of the X-ray image by the human operator.

In accordance with another broad aspect, the invention provides a system for use in screening pieces of luggage. The system comprises at least two X-ray scanners for scanning the pieces of luggage with X-rays to derive X-ray images of the pieces of luggage. The system further comprises a computing device including an input for receiving the X-ray images from the X-ray scanners. The computing device is programmed with software for screening the pieces of luggage in accordance with the above described method.

In accordance with another broad aspect, the invention provides a computer readable storage medium storing a program element for execution by a computing device. The program element, when executed by the computing device, causes the execution of a method by the computing device of the type described above for screening pieces of luggage.

In accordance with another broad aspect, the invention provides a system for use in screening pieces of luggage. The system comprises at least two X-ray scanning devices for scanning the pieces of luggage with X-rays to derive X-ray images of the pieces of luggage. The system further comprises at least one automated threat detection engine for processing the X-ray images by applying an automated threat detection (ATD) operation. The system further comprises a remote screening station in communication with the at least two X-ray scanning devices and with the at least one automated threat detection engine. The remote screening station includes a display device for exchanging information with a human operator. The remote screening station is responsive to a request entered at the remote screening station by the human operator for:

releasing for display on the display device an X-ray image on which an ATD operation has been applied, the X-ray image having been generated by one of the at least two screening stations;

providing a user interface tool for allowing the human operator to provide at the remote screening station threat assessment information associated with the X-ray image being displayed;

in response to receipt of threat assessment information provided by the human operator, causing the threat assessment information provided by the human operator to be conveyed to an on-site screening technician associated with the one of the at least two screening stations.

In accordance with a specific implementation, the system further comprises local display devices associated with respective ones of the at least two X-ray scanning devices for conveying threat assessment information to on-site screening technicians associated with the X-ray scanning devices. In accordance with a specific implementation, the threat assessment information provided by the human operator at the remote screening station is conveyed to the on-site screening technician associated with the one of the at least two X-ray scanning devices through an associated one of the local display devices. In non-limiting examples of implementation, the threat assessment information indicates to the on-site screening technician whether a piece of luggage is marked as "clear" or marked for further inspection.

In accordance with a specific implementation, the system further comprises a processor programmed for determining whether to subject respective ones of the X-ray images derived by the at least two X-ray scanning devices to a visual inspection by the human operator at the remote screening station, wherein the determining is made at least in part based on results obtained by using the automated threat detection engine.

In accordance with a specific example of implementation, the processor is further programmed to cause at least some of the X-ray images derived by the at least two X-ray scanning devices to by-pass visual inspection by the human operator at the remote screening station.

In specific implementations, the X-ray images displayed at the remote screening station are associated with results obtained by applying an ATD operation, so that "on demand" the human operator views both the X-ray image of the piece of luggage as well as the associate ATD results. In such a system, the latency due to displacing the pieces of luggage on the conveyor belt at an X-ray scanning devices can be at least in part accounted for, which results in a more optimized screening process. Depending on the manner in which practical implementations of the system are embodied, it is believed that efficiencies in throughput ranging between twenty (20%) and thirty (30%) percent over that of stand-alone X-ray scanning devices could be achieved.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

A detailed description of examples of implementation of the present invention is provided herein below with reference to the following drawings, in which.

Figure 1:
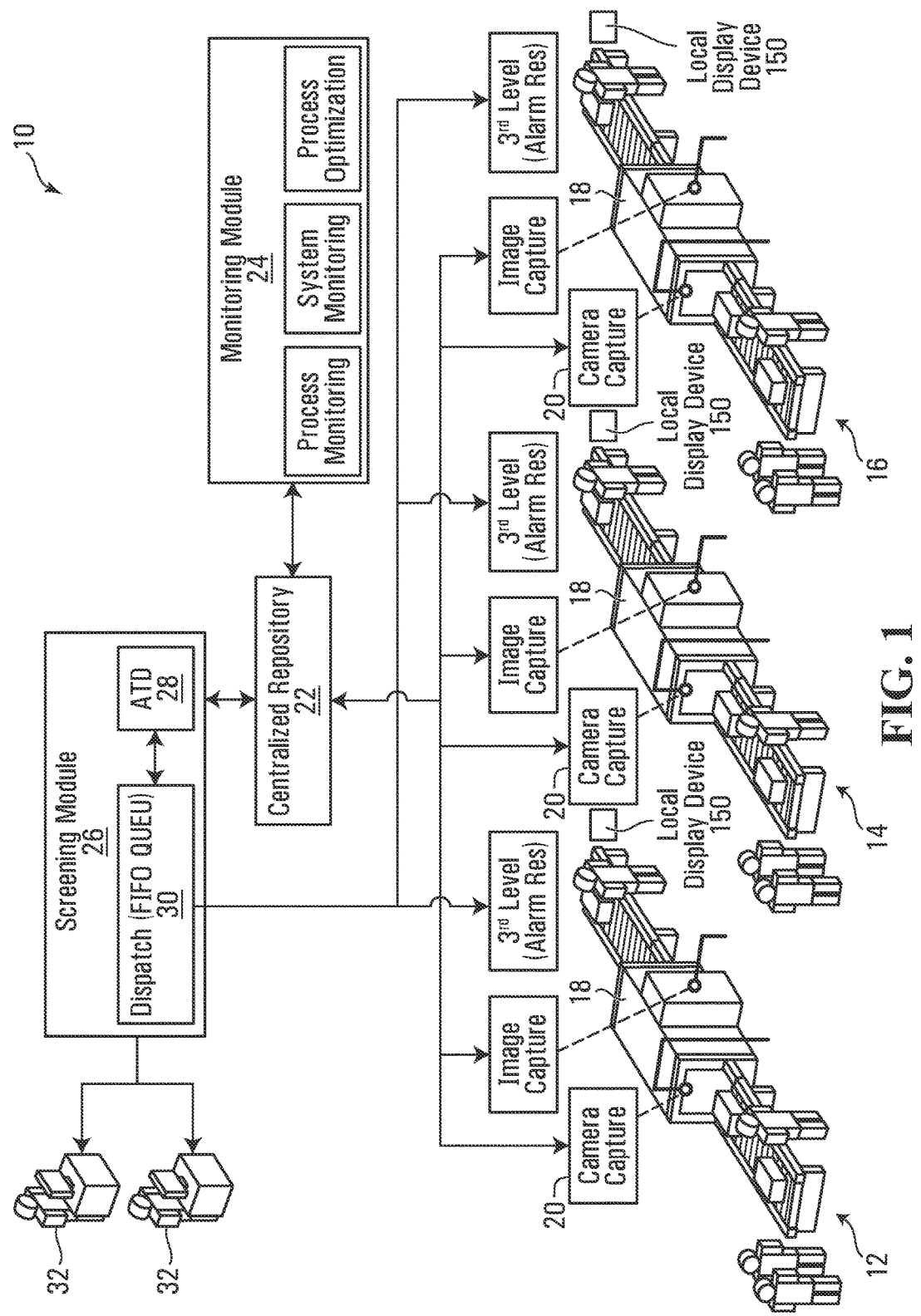
FIG. 1 shows a non-limiting example of a security checkpoint screening system in accordance with a specific non-limiting example of implementation of the present invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

Specific examples of implementation of the invention will now be described with reference to the Figures. In a specific example, the items under inspection are pieces of luggage. It however to be appreciated that the concepts presented herein are applicable in situations where the items under inspection are objects other than pieces of luggage, for example containers of liquid, shoes, lap-tops, purses, wallets, keys or any other type of objects screened at a security checkpoint.

Shown in FIG. 1 is an example of a security screening system 10 in accordance with a non-limiting embodiment of the invention. As shown, the security screening system 10 comprises three (3) security checkpoint screening stations 12, 14 and 16, each comprising a respective scanning device 18 that is capable of scanning items (such as pieces of luggage or other objects under inspection) using penetrating radiation (such as X-rays) in order to generate images of the items. The images generated are generally X-ray images that convey the contents of the scanned item. Examples of items being scanned include, without being limited to, closed suitcases, liquid products comprised of containers holding liquids, shoes, purses, belts, wallets, phones, cameras and lap-top computers.

In the embodiment depicted, the images from each of the security checkpoint screening stations 12, 14 and 16 are further processed, for example by applying automated threat detection (ATD) operations to the images and/or are displayed on a display device for visual inspection by one or more human operators. The ATD-related functionality may reside locally in the scanning devices 18 of each one of security checkpoint screening stations 12, 14 and 16 or, alternatively, may reside in a screening module remote from the scanning devices 18, such as in remote screening module 26 shown in FIG. 1. The further processing (e.g. by applying ATD operation) alone or in combination with input from the (human) operators determines whether the item under inspection should be marked as "clear" at the security checkpoint or marked for further inspection.

In the embodiment depicted, the images from each of the security checkpoint screening stations 12, 14 and 16 are transmitted to a centralized repository 22 to wait for either further processing and/or to be displayed on a display device for visual inspection by one or more human operators. In accordance with an alternative embodiment in which ATD-related functionality resides locally in the scanning devices 18, the images generated by the scanning devices 18 are first processed by applying automated threat detection (ATD)

operations to the images at the scanning devices 18 prior to being transmitted to the centralized repository 22 along with the results of obtained by applying the ATD operations.

The manner in which the images are handled by the security checkpoint screening system 10 will be described in more detail further on in the description.

Optionally, each of the security checkpoint screening stations 12, 14 and 16 comprises a camera 20 (which could be a video camera or still-shot camera) that is positioned at the entrance to the scanning device 18 to provide a picture image of the item under inspection by the scanning device 18. It should be appreciated that the camera 20 could alternatively be positioned at the exit of the scanning device 18, or at any location in between the entrance and exit to the scanning device 18, so long as the camera 20 is able to provide a picture image of the items under inspection by the scanning device 18 that provides useful information to a human operator.

As will be described in more detail in the present application, in accordance with a specific embodiment, a benefit of having a picture image of an item under inspection provided by camera 20 is to provide additional information to on-site screening technicians located at each of the security checkpoint screening stations. In particular, when the on-site screening technicians are presented with threat assessment information with respect to a piece of luggage, providing a picture image of the piece of luggage to the on-site screening technician facilitates the matching of the threat assessment information with the piece of luggage and reduces the likelihood of errors (the wrong piece of luggage being matched with given threat assessment information). In accordance with a specific embodiment, another benefit of having a picture image of an item under inspection provided by camera 20 is to provide additional contextual information to a human operator, for example a human operator at remote screening station 32. For example, a picture image of a piece of luggage may be displayed to the human operator at the remote screening station 32 concurrently with the X-ray image of the piece of luggage on which an ATD operation has been applied. Since the human operator at the remote screening station 32 will be unlikely to have the benefit of seeing the physical piece of luggage (or other object under inspection) prior to (or subsequent to) visual inspection, this picture image provides additional cues and/or contextual information to the human operator, which may influence results of the visual inspection of the X-ray image.

Although only three (3) security checkpoint screening stations 12, 14 and 16 are shown in FIG. 1, it should be appreciated that any number of security checkpoint screening stations could be included in alternative embodiments of the security checkpoint screening system 10. A more detailed description of these security checkpoint screening stations 12, 14 and 16, and of scanning devices 18, will be described in more detail below with respect to FIGS. 2 and 3.

In the embodiment depicted, the security checkpoint screening system 10 comprises a computer readable storage medium storing a centralized repository 22. The centralized repository 22 receives and stores the X-ray images generated by the scanning devices 18. The centralized repository 22 may receive the X-ray images in substantially real-time, as the images are being generated by the security checkpoint screening stations 12, 14 and 16. In order to be able to identify each of the received images at the centralized repository 22, each image file may be associated with an identification stamp (which could be a serial number, for example), a time-stamp and an indication of which one of the security checkpoint screening stations 12, 14 and 16 generated the X-ray image.

As will be discussed further on in the description, the centralized repository 22 is in communication with the security checkpoint screening stations 12, 14 and 16 over a computer network. The centralized repository 22 may be in wire-line or wireless communication with the security checkpoint screening stations 12, 14 and 16. Any suitable security measures (encryption etc. . . . ) for protecting the information that is being transferred over the computer network may be used. Such security measures are well-known in the art and are beyond the scope of the present application and as such will not be described further here.

In certain circumstances, the centralized repository 22 may also receive and store picture images, which may be video or still-shot images, obtained from the cameras 20. The picture images may also be associated with respective identification stamps (which could be serial numbers), a time-stamp and an indication of which of the security checkpoint screening stations 12, 14 and 16 generated the picture image. The picture image is mapped to an associated X-ray image in the centralized repository 22. This mapping may be done in any suitable manners known to people of skill in the art.

As shown in FIG. 1, the centralized repository 22 is in communication with a monitoring module 24 and a screening module 26. The monitoring module 24 includes one or more processing units programmed to perform various functions including process monitoring, system monitoring and process optimization. A purpose of the monitoring module 24 is to generate and maintain information on the security screening process that can be used to performed diagnostics and/or an analysis of how the process is performing. Such information may be used, for example, to identify potential issues/problems in the process and/or indentify areas that require improvement. In a non-limiting example of implementation, the monitoring module 24 computes/collects threat detection statistics, maintains a log of automated detection results, maintain a log of certain X-ray images in the centralized repository 22 and/or perform any other useful processes. The operations performed by the monitoring module 24 are beyond the scope of the present application and as such will not be described in further detail here.

It is also to be appreciated that, although useful in practice, the monitoring module 24 may be omitted from certain alternative implementations of the invention.

During operation, the centralized repository 22 passes the images received from the security checkpoint screening stations 12, 14 and 16 to the screening module 26. In accordance with the embodiment of the invention depicted in the figures, the screening module 26 comprises an automated thread detector (ATD) module 28 for processing the images to detect potential threats depicted in the images. The automated thread detector (ATD) module 28 also includes functionality to highlight (or otherwise direct the attention of a human operator towards) regions of interest (ROIs) in the images potentially depicting a threat or a prohibited object. In an alternative embodiment, ATD-related functionality resides locally in the scanning devices 18, or on anoth device separate from screening module 26, and the images stored in the centralized repository 22 are associated with results obtained by applying ATD operations. In such alternative embodiment, the ATD 28 can be omitted from the screening module 26.

In accordance with a specific example of implementation, the screening module 26 also comprises a dispatch module 30 programmed for:

dispatching the images, when appropriate, to one or more remote screening stations 32 associated with human operators. The remote screening stations 32 are generally provided with a display screen (or portable viewing device) on which the X-ray images (which may include the results of the ATD process) can be viewed. The display screens of the remote screening stations 32 may display multiple X-ray images concurrently. The remote screening stations 32 may also be configured to support multiple different languages, such as English, French, German, Italian, Chinese, Dutch, etc. For example, at a remote screening station 32, a human operator can select a preferred language at the time of logon, or at the time of setting up a user account.

Transmitting threat assessment information associated with the images, when appropriate, to one or more on-site screening technicians associated with the scanning devices 18. The threat assessment information may convey that a given object depicted in an image is marked for further inspection or and that object is marked as clear.

It should be appreciated that the remote screening stations 32 may be located within relative physical proximity to the security checkpoint screening stations 12, 14 and 16 (for example in a same room), or alternatively may be located in a different room, different wing, different building or different city, among other possibilities.

In a specific example of implementation, threat assessment information associated with the objects under inspection is transmitted to the on-site screening technicians regardless of whether an item under inspection has been marked as "clear" or marked for further inspection. Alternatively, threat assessment information is transmitted to the on-site screening technicians only when items under inspection have been marked for further inspection. For the purpose of completeness, the present description will consider the case where threat assessment information is transmitted to the on-site screening technicians regardless of whether an item under inspection has been marked as "clear" or marked for further inspection.

In the case where the screening module 26 and/or a human operator at one of the remote screening stations 32 determines, on the basis of an X-ray image, that the item under inspection is unlikely to contain a threat, threat assessment information conveying that the piece of luggage is marked as "clear" is transmitted to one or more of the on-site screening technicians located in proximity to the scanning devices 18. In accordance with a non-limiting example, threat assessment information may be sent to a receiver device at the scanning device 18, such as to cause a display screen 150 at the scanning device 18 to display a message to the associated on-site screening technician conveying that the piece of luggage is marked as clear. The message may take on many forms. For example, the message may be a very simple, rudimentary message, such as:

the illumination of a green-light when the object exits the scanner;

a text message, such as "clear", "OK".

Optionally, the image message may include the scanned (X-ray) image of the item as well as a picture image, video or still-shot, of the item as taken by one of the cameras 20.

In the case where the screening module 26 and/or a human operator at one of the remote screening stations 32 determines, on the basis of an X-ray image, that there could be a potential threat within an item under inspection, threat assessment information conveying that the piece of luggage is marked for further inspection is transmitted to one or more of the on-site screening technicians located in proximity to the scanning devices 18. The threat assessment information may be transmitted to the screening technicians in a variety of different manners. In accordance with a first non-limiting example, threat assessment information may be sent to a receiver device at the scanning device 18, such that a display screen 150 at the scanning device 18 is caused to display a message to the associated on-site screening technicians conveying that the piece of luggage is marked for further inspection. The message may take on many forms. For example, the message may be a very simple, rudimentary message, such as:

the illumination of a red-light when the object exits the scanner;

a text message, such as "hold and search", "inspect this bag" or "this object may contain a threat".

Alternatively, the message may be more sophisticated, and provide the on-site screening technician with an indication of the potential threat, such as:

a text message that indicates the type of threat that has been detected, such as "this item may contain a gun" or "this item may contain flammable liquid";

an image message that shows the item under inspection and points to, or otherwise visually identifies, the area of the item that should be further inspected. Optionally, the image message may include the scanned image of the item as well as a picture image, video or still-shot, of the item as taken by one of the cameras 20.

In the case where the threat assessment information conveys that the item is marked to undergo further (manual or other) inspection, the on-site screening technician at the security checkpoint screening station may stop the conveyor belt 106 of the screening apparatus while the further inspection is taking place, such that further images are not sent to the centralized repository 22. Alternatively, when an item is required to undergo further inspection, it is dispatched to another (secondary) screening area where it is further inspected such that the screening of items by the inspections devices 18 is uninterrupted.

In accordance with an alternative non-limiting embodiment, the threat assessment information may be sent to a wireless portable device held by one or more of the on-site screening technicians. In such a case, the on-site screening technicians may each have a dedicated portable device that is able to receive wirelessly from the screening module 26 threat assessment information associated with items screened by their respective security screening station 12, 14 or 16. When the threat assessment information conveys that an item has been marked for further inspection, the message displayed on the wireless portable device may, for example, take on any of the forms described above.

A display screen on the wireless portable device may further display a graphical user interface (GUI) that is able to convey messages to the on-site screening technician and provide functionality for permitting interactions with the on-site screening technician.

The above examples are presented here for the purpose of illustration only, and are not intended to limit the scope of the invention. It will be appreciated by the person skilled in the art, in light of the present description, that the message conveying that the piece of luggage is marked for further inspection, or is marked as clear, may take on a variety of different forms without departing from the spirit of the invention.

The manner in which the screening module 26 handles the X-ray images that are received from the security checkpoint screening stations 12, 14 and 16 can be done in a variety of manners, which will be discussed in more detail further on in the description, under the heading "centralized image screening".

By having the images from a plurality of security checkpoint screening stations 12, 14 and 16 pooled at a centralized location, certain inefficiencies that were associated with operating the security checkpoint screening stations 12, 14 and 16 in "stand-alone mode" can be reduced.

Firstly, such a system 10 can be helpful in reducing the delays due to the displacement of the various items under inspection through the screening stations 12, 14 and 16. For instance, as will be appreciated, when using conventional X-ray scanning devices of the type used in security screening, there is a delay time between the time a piece of luggage (or other item under inspection) is placed on the conveyor belt of the X-ray scanning device and the time an X-ray image associated with the item under inspection is generated and displayed for viewing by a screening operator. There may also be empty space on the conveyor belt between two different items under inspection which also results in further delays and a reduction in efficiency.

Further delays are incurred when the operator at a conventional scanning device moves the conveyor belt forwards or backwards (or stops the belt) to displace the items under inspection between different areas of the X-ray scanning device 18 in order to examine in greater detail the image of the items under inspection. In systems making use of automated threat detection (ATD) processes/systems, it is also to be appreciated that there is a delay time between the time the X-ray image associated with the item is generated and the time the ATD results are obtained and provided to the screening operators.

By pooling the images obtained from multiple scanning devices, some of these time delays can be curtailed. In a specific example of implementation, the images dispatched to a remote screening station 32 would only be dispatched for viewing by a human operator once the complete image has been collected at one of the screening stations 12, 14 or 16 (eliminating the lag time associated with displacing the item on the conveyor belt through the screening area). Optionally, the images dispatched to a remote screening station 32 would only be dispatched for viewing by a human operator once the complete image has been collected and the results applying an ATD operation to the image, either by the automated threat detection ATD module 28 or by a local ATD module associated with a scanning device 18. In this fashion delays associated with the scrolling of the image as well as delays associated with applying ATD operations to the image can be accounted for and result a more efficient usage of human operator time. Moreover, since images from multiple screening stations (12, 14 and 16 in the present embodiment) are pooled together, the overall throughput of the visual inspection of the images is less likely to be affected by delays associated to screening at a particular screening station. For example, even if one of the multiple screening stations is stopped, the processing of images originating from the other screening stations by human operators at remote screening stations 32 can go on, thereby also resulting in a more efficient usage of the human operators' time.

The above can impact both the time taken to screen items, and the number of employees required to man each of the security checkpoint screening stations 12, 14 and 16. Depending on how the centralized system is implemented, it is believed that efficiency improvements ranging between twenty (20%) and thirty (30%) percent or higher over stand-alone X-ray machines could be obtained. In some cases this would result in improved throughput of the security checkpoint (with the associated improvement in traveler's satisfaction) and/or in a potential reduction in the number of people required to man the security checkpoints (with the associated reduction in costs) while still achieving similar throughput levels.

Security Checkpoint Screening Stations 12, 14, 16

Figure 2:
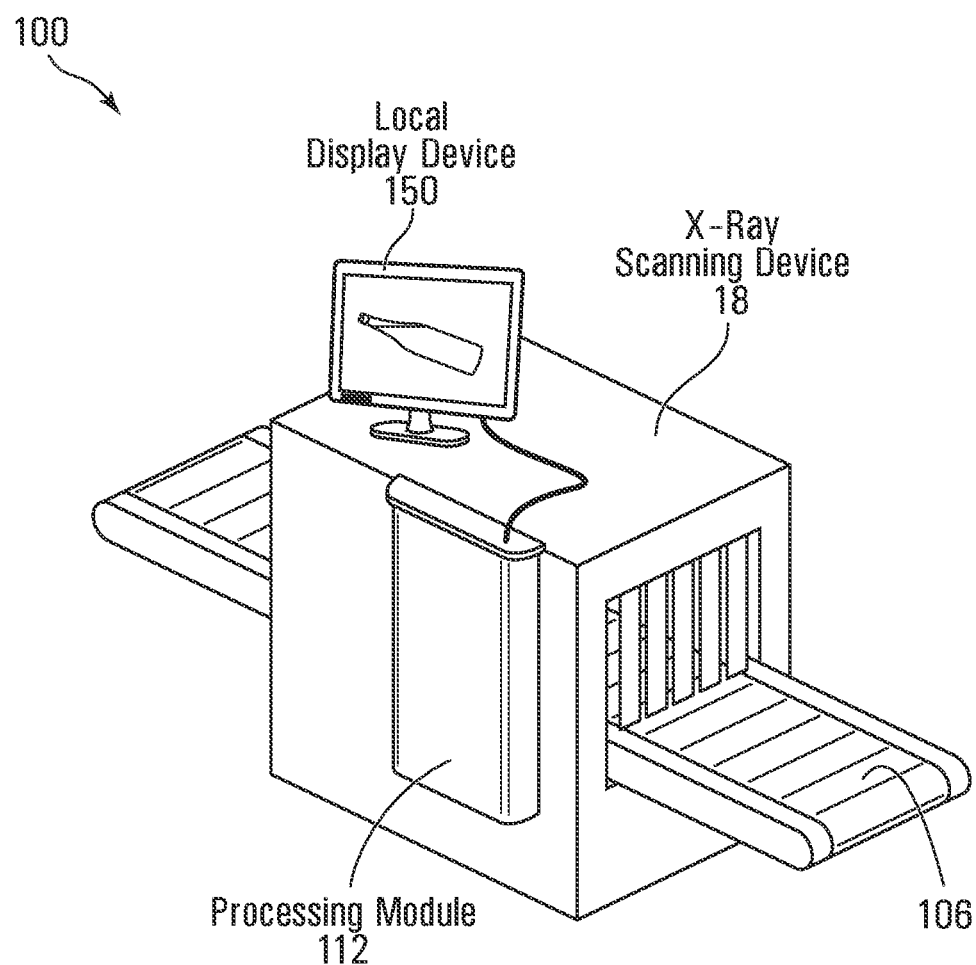
FIG. 2 shows a non-limiting example of a scanning device suitable for use in the security checkpoint screening system of FIG. 1.

Shown in FIG. 2 is a checkpoint screening station 100 suitable for obtaining an X-ray image (or alternative other type of image obtained using penetrating radiation) in accordance with a specific example of implementation of the present invention. Checkpoint screening station 100 corresponds to any one of screening stations 12, 14 16.

As depicted, the checkpoint screening station 100 includes a scanning device 18 for scanning objects, a processing module 112 and a communication device 150 for conveying information to an on-site screening technician.

The scanning device 18 is adapted for scanning an item, such as a piece of luggage or a liquid product for example, that may contain a potential threat (which could be a weapon, an explosive, or an unauthorized liquid, among other possibilities) using X-rays to generate X-ray data conveying an X-ray image of the item under inspection. In a specific example of implementation, the scanning device 18 is in the form of an X-ray machine typical of the type of device used to scan pieces of luggage at security checkpoints within airports and other transportation locations. The X-ray machine may be a single view X-ray machine or a multi-view X-ray machine.

The processing module 112 receives the X-ray data from the scanning device 18 and transmits that X-ray data to the centralized repository 26 over a network connection (not shown). In a specific example of implementation, the processing module 112 includes the required hardware and software components for enabling a bi-directional communication between the scanning device 18 and other devices on the network including the central repository 22. In a variant, the processing module 112 is programmed to apply ATD operations to the X-ray images and to transmit the results of the ATD operations to the centralized repository 22 along with the associated X-ray images.

The communication device 150 may be any device suitable for conveying information to a user of the checkpoint screening station 100. In the embodiment depicted, the communication device 150 is in the form of a local display device that displays message to an on-site screening technician based on threat assessment information associated with the X-ray images generated. In a non-limiting implementation (not shown in the figure) the local display device is positioned near the exit of the tunnel of the X-ray scanning device 18. It is to be appreciated that although the embodiment depicted in FIG. 2 shows a communication device 150 in the form of a display screen, it is to be appreciated that communication device 150 may take other forms, such as for example a portable device (including a smart-phone for example) that can be carried by the on-site screening technician or a computing station separate from scanning device 18. In addition, although communication device 150 is shown as displaying an image, it will be apparent to the person skilled in the art in light of the present description that other suitable forms of communication can be used. In other specific examples of implementation, the communication device 150 may include a printer adapted for displaying in printed format information related to the determined threat status of the item under inspection. As a variant of this non-limiting example, the printer is configured to print threat status information on a label type substrate. The printed threat status information may be in the form of a barcode, for example. In such cases the on-site screening technician takes the label and affixes it to the item under inspection using the adhesive on the backside of the label. The person skilled in the art will readily appreciate, in light of the present specification, that other suitable types of communication devices may be used in alternative examples of implementation of the present invention.

Figure 3:
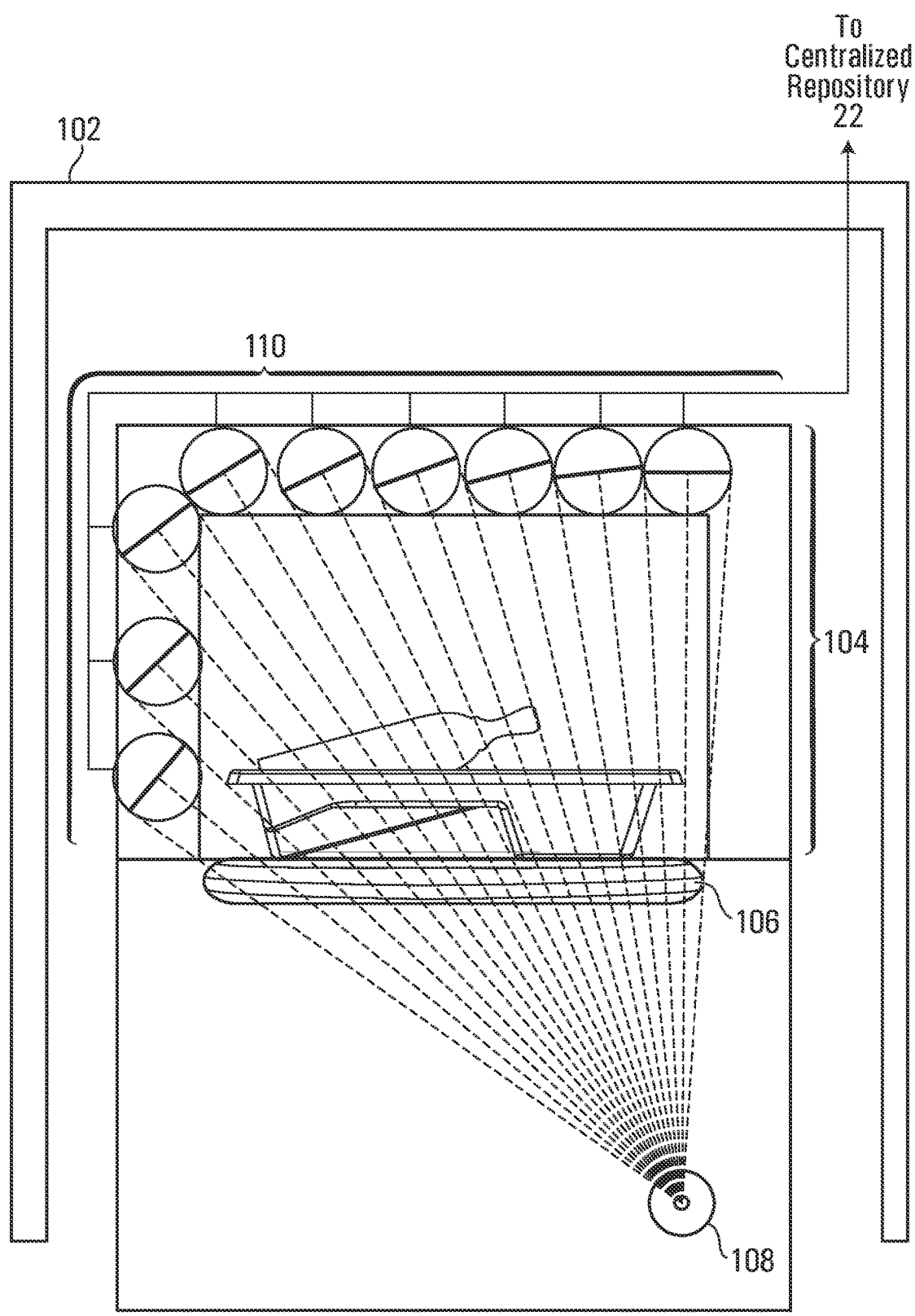
FIG. 3 is a diagrammatic representation of an inspection area of the scanning device depicted in FIG. 2.
Figure 4:
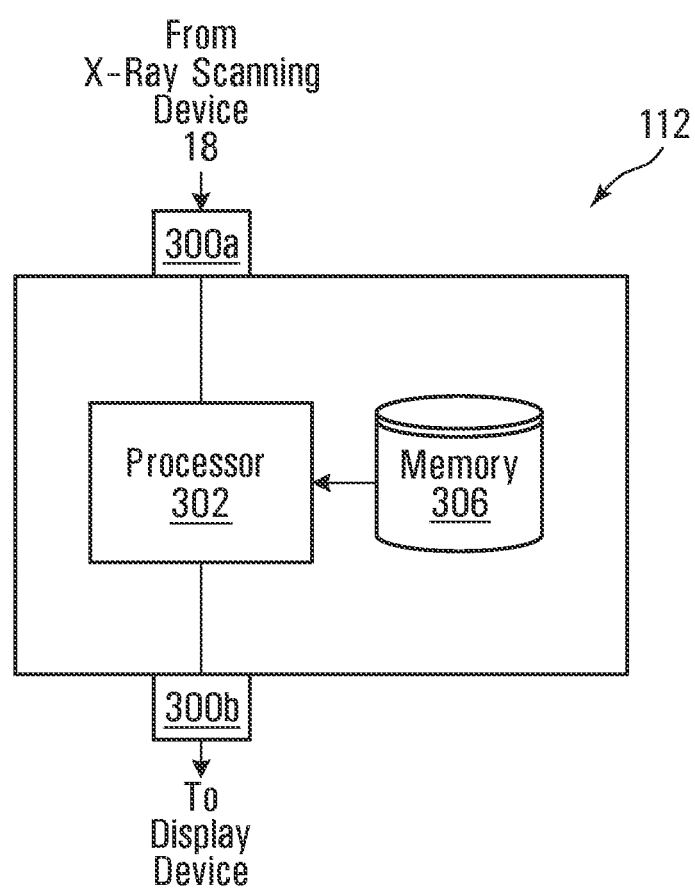
FIG. 4 is a non-limiting example of a processing module for use in processing X-ray images of objects under inspection, such as pieces of luggage, suitable for use in a security checkpoint screening system of the type depicted in FIG. 1.

The scanning device 18 will now be described in greater detail with reference to FIG. 3. As depicted, the scanning device 18 includes a scanning area 104, a conveyor belt 106, an X-ray source 108 and an array of X-ray detectors 110. The scanning device 18 performs an X-ray inspection by subjecting items in the scanning area to penetrating radiation in the form of X-rays to generate X-ray image data.

The scanning area 104 (also referred to as scanning tunnel) is defined by an enclosed void between the X-ray source 108 and the array of X-ray detectors 110. The scanning area 104 is typically horizontally oriented and is dimensioned both vertically and horizontally to accommodate the types of items to be scanned, including pieces of hand-carried luggage allowed onboard a commercial aircraft, such as handbags, backpacks, briefcases and shopping bags, among others as well as liquid products including bottles holding liquids and electronic devices, such as cameras and lap-top computers. The scanning area 104 is centrally traversed by a conveyor belt 106 that is used to displace items to be scanned both into and out of the scanning area 104.

The items to be scanned can be placed either directly on the conveyor belt 106 or in one or more trays that are then placed on the conveyor belt 106.

The conveyor belt 106 is a horizontally-oriented continuous belt of material arranged in an endless loop between two terminal rollers. The belt 106 has an exterior surface on which objects or trays containing the items to be scanned are placed, as well as an interior surface within which the terminal rollers (as well as other guide rollers and/or supports) lie.

The width of the conveyor belt 106 is sufficient to accommodate the placement of trays within which the items to be scanned (e.g. liquid products, wallets, and lap-top computers) are placed, while its overall length is sufficient to create an endless loop whose length includes:

A pre-scan area that lies before the scanning area 104, where the items to be scanned are placed on the belt 106;

The scanning area 104, where the items being scanned are subjected to penetrating radiation (i.e. X-rays); and A post-scan area that lies after the scanning area 104, where the items that have been scanned emerge after being subjected to penetrating radiation. It is in that area that a user can pick up his or her items (such as luggage items, lap-top computers and liquid products amongst others) and/or where items under inspection that have been marked for further inspection are forwarded for dispatch to secondary screening.

It is worth noting that the terminal rollers constituting the end points of the conveyor belt 106 at the pre-scan and post-scan areas may be connected to motors (not shown) that allow an operator to move the belt 106 forwards or backwards to displace the objects to be scanned between different areas of the X-ray scanning device 18.

The X-ray source 108 is the source of penetrating radiation (in this case, X-ray radiation). The X-ray source 108 is located opposite to the array of X-ray detectors 110 so that X-rays emitted by the source 108 pass through the items under inspection that are located on the conveyor belt 106 and are detected by the array of X-ray detectors 110 as a result. In a non-limiting example, the scanning device 18 is a dual-energy X-ray scanner and the X-ray source 108 emits X-rays at two distinct photon energy levels, either simultaneously or in sequence. Example energy levels include 50 keV (50 thousand electron-volts) and 150 keV, although persons skilled in the art will appreciate that other energy levels are possible.

The array of X-ray detectors 110 detects the penetrating radiation (i.e. X-rays) that was emitted by the X-ray source 108 and that penetrated the items under inspection. The array of X-ray detectors 110 is located opposite to the X-ray source 108 so that X-rays that are emitted by the source 108 pass through the items that are located on the conveyor belt 106 and are detected by the array 110.

Centralized Image Screening

With reference to FIG. 1, the X-ray images are generated by the multiple security checkpoint screening stations 12, 14 and 16 are transmitted to the centralized repository 22 over a network connection. Optionally results obtained by applying ATD operations to the images at the checkpoint screening stations 12, 14 and 16 are also transmitted to the centralized repository 22 over the network connection.

These X-ray images (and optional ATD results) are stored in a computer readable storage device and form part of the centralized repository 22.

In a non-limiting example of implementation, the X-ray images in the centralized repository 22 are passed to the screening module 26 in a first-in-first-out (FIFO) manner.

In an alternative example of implementation, the images may be associated with respective priority rankings either depending on the security checkpoint screening stations 12, 14 and 16 used (for example there may be a station for higher priority flights/people) or depending on some other type of criteria. In this alternative implementation, the images in the centralized repository 22 may be provided to the screening module 26 out of order depending on their priority ranking so that images associated with a higher priority are provided before images associated with lower priority. Variants in the scheduling of the images can also be contemplated—for example images may be associated to a priority ranking that is modified in accordance with how long the image has been waiting (using an image time-stamp for example). Such variants will become readily apparent to the person skilled in the art in light of the present description and as such will not be described in further detail here.

The screening module 26 (shown in FIG. 1) is in communication with the centralized repository 22 for receiving X-ray images associated with items under inspection by the scanning devices 18 at the different security checkpoint screening stations 12, 14, 16. Optionally, ATD results (when available) associated with the X-ray images are also transmitted to the screening module 26 over the network connection.

As will be described in more detail below, the screening module 26 comprises a processor, a memory unit for storing data and program instructions for use by the processor and an output in communication with one or more remote screening stations 32. The screening module 26 is also in communication with the (local) communication devices 150 associated with each of the security checkpoint screening stations 12, 14, 16 either directly or through the processing module 112 (shown in FIG. 2) for conveying the threat assessment information to on-site screening technicians at the security checkpoint screening stations 12, 14, 16.

As mentioned above, the manner in which the screening module 26 processes the received images can be done in a variety of different manners, some non-limiting examples of which are described below.

Example 1—all Images are Transmitted to a Remote Screening Station

Figure 5:
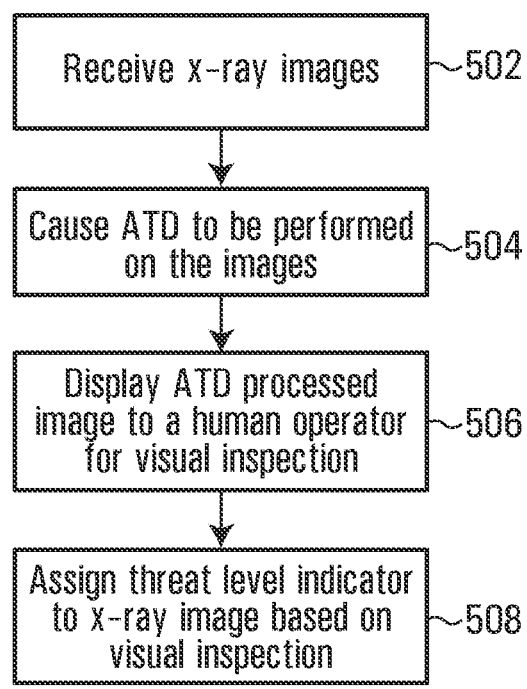
FIGS. 5-8 show non-limiting examples of processes for processing X-ray images of objects under inspection, such as pieces of luggage, in a security checkpoint screening system of the type depicted in FIG. 1.

Shown in FIG. 5 is a first non-limiting example of a process that can be used by the screening module 26 in order to process the X-ray images received from the centralized repository 22. In this first example, all the images that are received from the centralized repository 22 are provided to a remote screening station 32, such that it is a human operator that determines whether or not the items should be marked as "clear" (e.g. allowed to be claimed by the owner without additional inspection) or marked for further inspection (e.g. caused to undergo manual inspection by an on-site screening technician at the security checkpoint screening station).

At step 502, the screening module 26 receives an X-ray image, or a set of images, from the centralized repository 22. The images may be received at the screening module 26 one-at-a-time, or in sets, among other possibilities. For the purpose of this example, the images are provided to the screening module 26 in a first-in-first-out (FIFO) manner, such that the images are received at the screening module 26 in an order that is consistent with the order that the images are received at the centralized repository 22. In the specific embodiment, shown, it is the dispatch module 30 (shown in FIG. 1) that receives the images.

At step 504, an automated threat detection (ATD) operation is caused to be performed on the received X-ray images. More specifically, the images are passed to ATD module 28 that is programmed for detecting a potential threat (such as a weapon, an explosive or an unauthorized liquid) within the image, and in certain circumstances for causing a portion of the image that contains a detected potential threat to be highlighted/emphasized as being a region of interest (ROI). Performing an ATD operation on an image may be useful in providing assistance to a human operator associated with a remote screening station 32 in assessing the threat status of an item under inspection. The ATD operation may be performed using any suitable process known in the art. The specific ATD operations applied are being the scope of the present application and as such will not be described in further detail here.

It is to be appreciated that in alternative implementations in which the ATD operations are applied locally at the security checkpoint screening stations by processing module 112 (shown in FIG. 2), the ATD results associated with the X-ray images are already available through the central repository 22 and thus step 504 can be omitted.

Once the ATD results for an X-ray image are obtained, at step 506, the X-ray image along with the ATD results are processed by the dispatch module 30, which forwards the ATD processed image (X-ray image+ATD results) to the next available remote screening station 32. The availability of a given remote screening stations 32 may be determined automatically by the dispatch module 30 or/alternatively may be inferred following the receipt of a request signal issued by a human operator at the screening station 32. In a non-limiting implementation, the request signal is triggered by the human operator by pressing a key or button indicating that the human operator is ready to receive the next image for visual inspection. In response to receipt of a request signal, the screening module 26 transmits the image for display and visual inspection to the remote screening station 32 that issued the request signal. The image displayed at the remote screening station 32 may include the X-ray image generated by the scanning device 18 (shown in FIG. 1) as well as additional information made available by the ATD operation. In the case where the ATD operation detected a potential threat within the image, the ATD processed image that is provided to the remote screening stations 32 may include one or more visual cues (such as a highlighted portion) identifying a region of the image in which a potential threat may be located. This information is intended to assist the human screener associated with screening station 32 in focusing on an area of interest when visually inspecting the ATD processed image to more easily indentify potential threats.

In certain circumstances, a picture image (which may be a video or still-image) from the camera 20 (shown in FIG. 1) may be provided to the remote screening stations 32 together with the ATD processed image, such that the human operator associated with the remote screening station 32 is provided with some visual context surrounding the scanned item that he/she is inspecting in addition to the X-ray image of the item. The picture image from the camera 20 may be provided to the remote screening station 32 with every ATD processed image or with only those images in which a potential threat has been detected by applying the ATD operations. Alternatively, the picture image may only be provided to the remote screening stations 32 when explicitly requested by the human operator. In such a case, the screening module 26 will only provide the picture image to the remote screening stations 32 "on-demand".

In the embodiment shown in FIG. 1, two (2) remote screening stations 32 are shown. It should however be appreciated that, in alternative examples of implementation of the invention, there could be a single remote screening station or more than two (2) remote screening stations 32. In cases where there are two (2) or more remote screening stations 32, the dispatch module 26 of the screening module 26 may distribute the ATD processed images to the plurality of remote screening stations 32 in a variety of manners. For example:

in accordance with a pre-determined order, such the ATD processed images are distributed in an orderly fashion, wherein the remote screening stations 32 receive the ATD processed images in sequence in a polling mode (one at a time);

on-demand, such that whenever a remote screening station 32 issues a request for another image (via pressing a button, or clicking on an icon on a GUI, for example) that remote screening station 32 is provided with the next ATD processed image;

on the basis of the security checkpoint screening station that generated the image, wherein different human operators are responsible for different scanning devices 18. In this manner, the dispatch module 30 may be configured to forward images originating from the same two or three scanning devices 18 to a same remote screening station 32;

on the basis of experience. For example, the dispatch module 30 may be configured to forward an ATD processed image with a detected potential threat to one of the screening stations 32 associated with a human operator having more experience. Alternatively, a same image may be sent to two or more remote screening stations 32 in parallel to get multiple threat assessments. This is particularly useful in situations where a trainee (having less experience) is reviewing the X-ray images at the same time as his supervisor (having more experience). The trainee could "practice"

visually inspecting real X-ray images while the results of the visual inspection obtained by the supervisor would be the ones used. This configuration has the advantage of not impacting throughput (at least not significantly) nor screening quality;

on the basis of the type of threat, wherein the dispatch module 30 may be configured to forward images depending on a type of potential threat detected (i.e. weapon, explosive, liquid, etc) to a specific one of the screening stations 32.

It is to be appreciated that the above examples are given for the purposes of illustration only, and that other variants will become apparent to the person skilled in the art in light of the present description.

As a result of the visual inspection of the ATD processed image, the human operator at the remote screening stations 32 can assign a threat level indicator to the X-ray image. The threat level indicator may convey that the item is marked for further inspection or that the item is marked as clear. In a specific example of implementation the remote screening stations 32 provide a user control interface for allowing the user operator to enter the threat level indicator. The user control interface may be, for example, in the form on a key pad, one or more icons on a GIU operable via a touch sensitive screen or any other suitable means for enabling a human operator to provide the threat level indicator in association with an X-ray image. Optionally, the remote screening station 32 may provide a user interface tool for allowing the human operator to draw on or otherwise annotate the displayed X-ray image in order to depict (or refine) the Region of Interests (ROIs) in the image or provide some additional information.

The threat level indicator provided by the human operator, along with the (annotated) X-ray image and optionally a picture image of the item under inspection, are then transmitted over the network to an on-site screening technician located at the appropriate security checkpoint screening station. The threat assessment information may be transmitted to a communication device 150 (described above with reference to FIG. 2) associated with one of the screening technicians. The threat assessment information may contain any of the messages as described above, amongst others instructing the screening technicians to perform further manual inspection of the item under inspection is appropriate.

Figure 6:
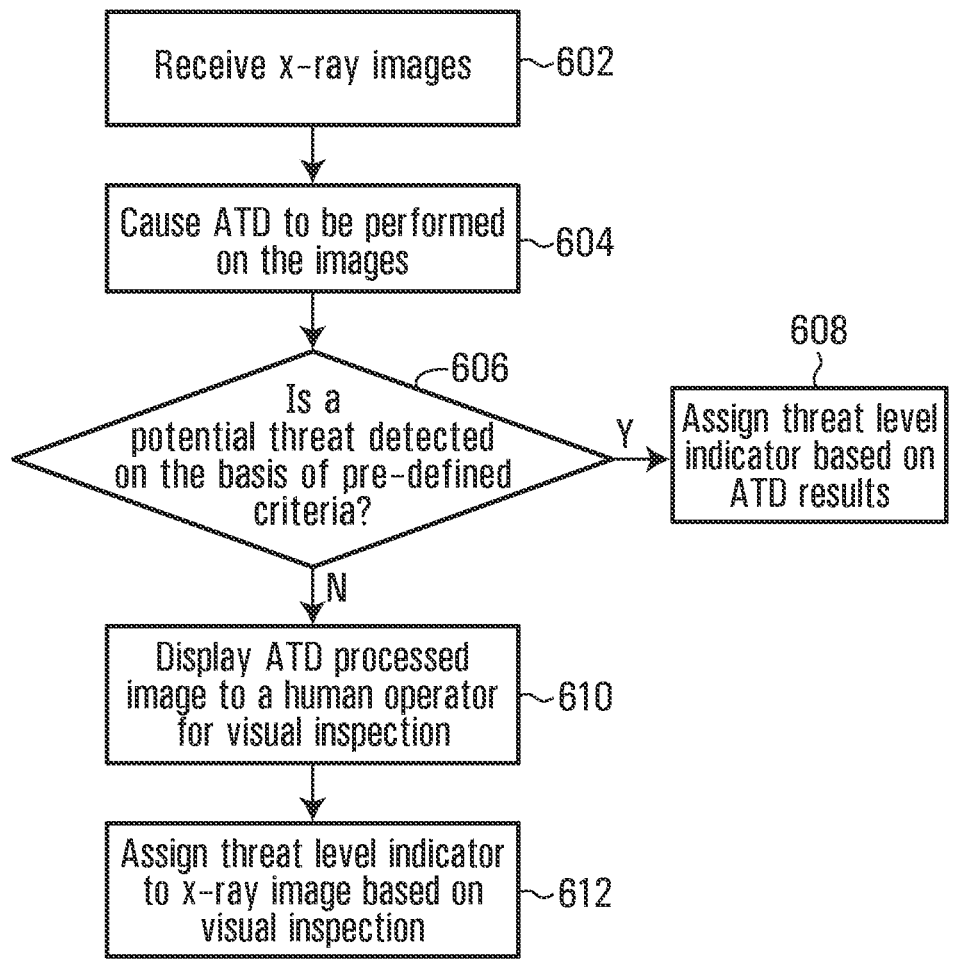

Example 2 only images for which the ATD results conveyed no detected threats are reviewed by a human operator for other images (i.e. those for which the ATD results conveyed the presence of a potential threat) visual inspection by a human operator is by-passed and threat assessment information conveying that the items is marked for further inspection is automatically generated by the screening module 26 based on the ATD results Shown in FIG. 6 is a second non-limiting example of a process that can be used by the screening module 26 in order to process the X-ray images received from the centralized repository 22. In this second example, when an ATD operation detects a potential threat within an image, the screening module 26 automatically generates and transmits threat assessment information to the corresponding security checkpoint screening station conveying that the item has been marked for further inspection. In this manner, the step of displaying such images at the screening station 32 for visual inspection by a human operator is by-passed. The other ATD processed images (i.e. the images for which the ATD did not detect any potential threat) are provided to a remote screening station 32, such that a human operator can perform a visual inspection of the X-ray image.

In a first variant, when an ATD operation detects within an image a liquid product, the screening module 26 automatically generates and issues threat assessment information to the corresponding security checkpoint screening station conveying that the item has been marked for further inspection. In this fashion, the step of displaying images at the screening station 32 conveying liquid containers is by-passed.

In another but similar variant, when an ATD operation detects within an image a liquid product holding a liquid constituting a potential threat, the screening module 26 automatically generates and issues threat assessment information to the corresponding security checkpoint screening station conveying that the item has been marked for further inspection. In this fashion, the step of displaying images at the screening station 32 conveying liquid containers where the liquid in the container was determined to constitute a potential threat is by-passed.

It is to be appreciated that a human operator observing an X-ray image of a container of liquid will not be able to make a determination as to the nature of the liquid in the container. As such, by by-passing the screening station 32 in cases where the liquid held in a container is a threat, an improvement in efficiency can be achieved without having an impact on the overall security screening performance. The other ATD processed images (the images for which the ATD did not detect liquid containers holding potential liquid threats) are provided to a screening station 32, such that a human operator can determine whether any potential threats were missed by the ATD operation performed by ATD module 28.

Steps 602 and 604 are similar to steps 502 and 504 as described above with reference to FIG. 5. At step 602, the screening module 26 receives an image, or a set of images, from the centralized repository 22, and at step 604, an automated threat detection (ATD) operation is performed on the received images. Similarly to step 504, step 604 may be omitted for implementations in which the ATD operations are applied locally at the security checkpoint screening stations by processing module 112 (shown in FIG. 2).

At step 606 the screening module 26 determines, on the basis of the results obtained by applying an ATD operation to an X-ray image, whether a potential threat has been detected within that X-ray image. Determining whether a potential threat has been detected may be done in a variety of manners and will generally be based on pre-defined criteria and heuristic rules, such as:

whenever a liquid product is detected, it may be determined that a potential threat has been detected or, alternatively, whenever a liquid product determined to contain a potential threat is detected, it may be determined that a potential threat has been detected;

whenever a pre-defined confidence level has been exceeded as to the presence of a threat, it may be determined that a potential threat has been detected;

whenever a certain shape has been detected (such as a gun shape), it may be determined that a potential threat has been detected.

When at step 606 the screening module 26 determines based on the ATD results that a threat has been detected, the system proceeds to step 608, where the screening module 26 generates and a transmits threat assessment information, along with the X-ray image and optionally a picture image of the item under inspection, to an on-site screening technician located at (or in proximity to) the security checkpoint screening station that generated the X-ray image. A visual cue identifying the region of the image where the potential threat was identified may also be transmitted. The threat assessment information conveys to the on-site screening technician that the item under inspection has been marked for further inspection.

As described above, upon determination that the image depicts a potential threat, threat assessment information is generated by the screening module 26. Optionally, one of the human operators at one of the remote screening stations 32 can be advised of this determination prior to the threat assessment information being transmitted to the on-site screening technician located at (or in proximity to) the security checkpoint screening station that generated the X-ray image, such that this human operator is given the opportunity to override the decision made by the screening module 26. In this manner, a human operator has the ultimate decision to submit or override threat assessment information that will be sent to the on-site screening technicians at the security checkpoint screening station. Alternatively, the threat assessment information that is generated by the screening module 26 is transmitted to the security checkpoint screening station directly without having been reviewed by a human operator. In this manner, the visual inspection by the human operator at remote screening station 32 is by-passed.

In the case where the screening module 26 did not determine, on the basis of the ATD processed image and the pre-defined criteria, that a potential threat was detected, the screening module 26 proceeds to step 610 which forwards the ATD processed image (X-ray image+ATD results) to the next available remote screening station 32.

Step 610 of this process is similar to step 506 described above with reference to FIG. 5, and as such the description will not be repeated in detail herein. It should, however, be appreciated that the ATD processed image that is provided to the remote human screener 32 may include visual cues in order to identify a region of interest that did not meet the pre-defined criteria for automatically being considered a potential threat, but that nevertheless may be useful in visually inspecting the image.

Step 612 of this process is similar to step 508, described above, and as such the description will not be repeated herein.

Example 3

Figure 7:
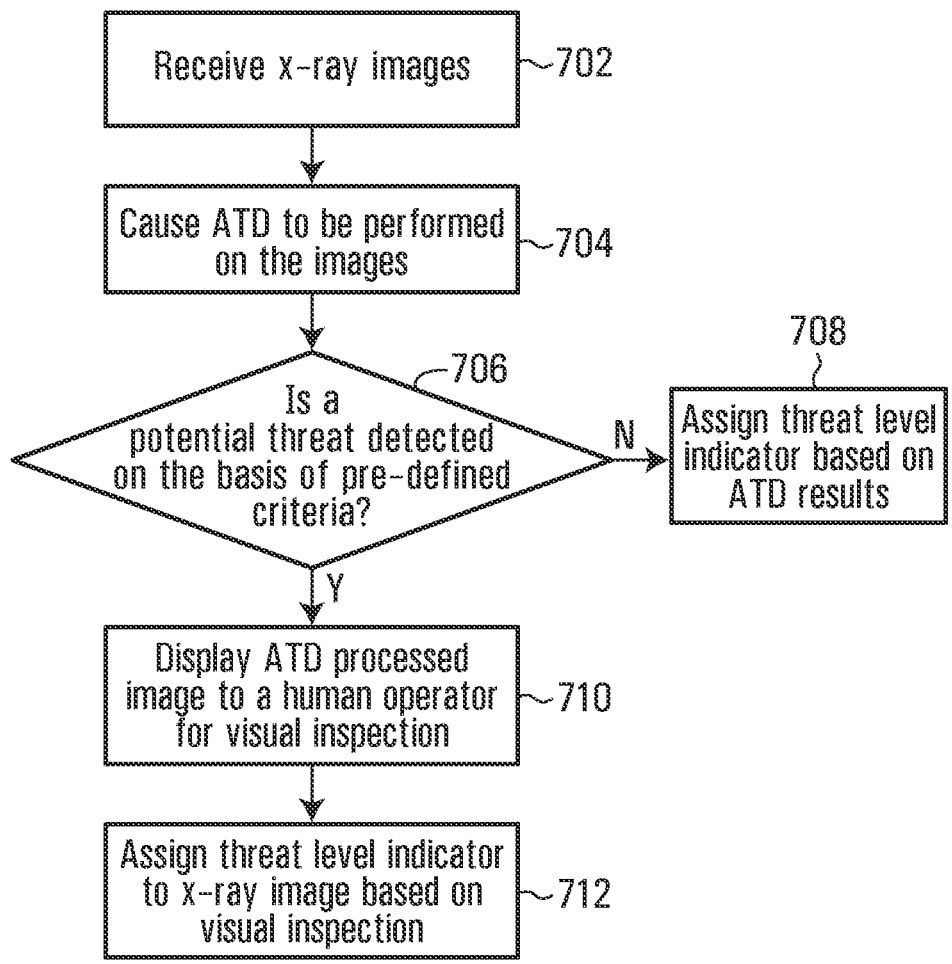

Only images identified by the ATD results and containing potential threats are reviewed by a human operator in order to assign threat assessment information.
for other images (i.e. those for which the ATD result does not conveys the presence of a potential threat) visual inspection by a human operator is by-passed and threat assessment information conveying that the items is marked as clear is automatically generated by the screening module 26 based on the ATD results Shown in FIG. 7 is a third non-limiting example of a process that can be used by the screening module 26 in order to process the X-ray images received from the centralized repository 22. In this third example, images that contain a potential threat, as identified by results obtained by applying an ATD operation, are provided to a human operator associated with one of the remote screening stations 32 for visual inspection in order to determine whether or not the object associated with the image should be marked as "clear" (i.e. no additional inspection required) or marked for further inspection. The other ATD processed images for which no threat have been identified by the ATD operation are not further visually inspected by a human operator. The visual inspection is thus by-passed for these images. As a side note, it is to be appreciated that this alternative embodiment places a high level of reliance on the abilities of the ATD engine to detect the presence of threats. In practical implementations, the rate of false rejections (threats being detected by the ATD engine when there is in fact no threat in the image) would likely have to be set to a higher level in order to be able to rely more comfortably such a system.

Steps 702 and 704 are similar to steps 502 and 504 as described above with reference to FIG. 5 and as such the description of these steps will not be repeated here.

At step 706 the screening module 26 determines, on the basis of results obtained by applying an ATD operation to an X-ray image, whether a potential threat has been detected within that X-ray image. Determining whether a potential threat has been detected on the basis of the ATD processed image may be done in a variety of manners and will generally be based on pre-defined criteria, such as:

whenever a liquid product is detected, it may be determined that a potential threat has been detected or, alternatively, whenever a liquid product determined to contain a potential threat is detected, it may be determined that a potential threat has been detected;

whenever a pre-defined confidence level in the detection of a threat has been exceeded, it may be determined that a potential threat has been detected. In this example, the pre-defined confidence level may be set quite low, such that a wide net is cast, and a potential threat is detected whenever an image displays any questionable region of interest;

whenever a certain shape has been detected (such as a gun shape), it may be determined that a potential threat has been detected.

When the screening module 26 determines based on the ATD results that an image does not contain any potential threat, the screening module 26 proceeds to step 708, where the screening module 26 generates and a transmits threat assessment information, along with the X-ray image and optionally a picture image of the item under inspection, to an on-site screening technician located at (or in proximity to) the security checkpoint screening station that generated the X-ray image. The threat assessment information conveys to the on-site screening technician that the item under inspection has been marked as clear and can be released to its owner. In this manner, X-ray image that have been determined unlikely to contain a potential threat with a high level of comfort by-pass visual inspection by a human operator at a remote screening station 32.

However, when the screening module 26 determines at step 706 that an ATD processed image potentially contains a threat, the screening module 26 proceeds to step 710 which forwards the ATD processed image (X-ray image+ATD results) to the next available remote screening station 32.

Step 710 of this process is similar to step 506 described above with reference to FIG. 5, and as such the description will not be repeated in detail herein.

Step 712, which follows step 710, is similar to step 508, as described above, and as such the description will not be repeated here.

Example 4—Treat Images Differently Depending on Threat Type

Figure 8:
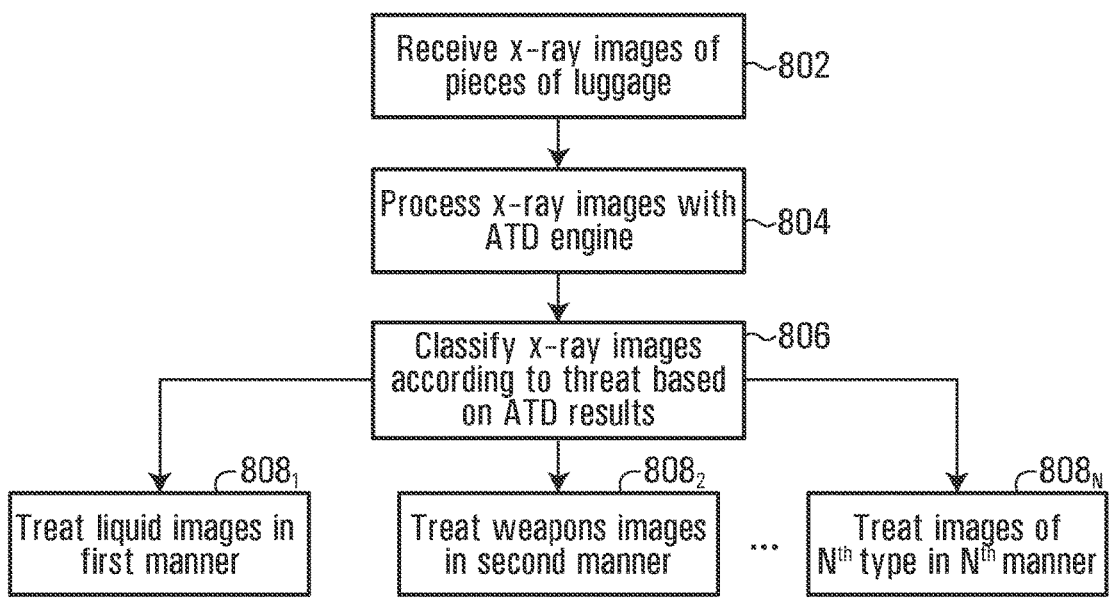

Shown in FIG. 8 is a fourth non-limiting example of a process that can be used by the screening module 26 in order to process the X-ray images received from the centralized repository 22. In this fourth example, images are assigned to one or more different categories based on results obtained by applying an ATD operation to the images and the images are handled differently depending on their assigned category. This allows for a screening process that takes into consideration different threat types, and treats different threat types differently.

Steps 802 and 804 are substantially the same as steps 502 and 504 as described above in with reference to FIG. 5 and as such the description will not be repeated here.

At step 806 the screening module 26 assigns to categories the ATD processed images. In general, the different categories relate to different threat types that can be detected by the ATD operations. For example, each ATD processed image may be assigned to a category according to whether:
- a liquid product (e.g. a bottle holding a liquid) has been detected;
- a weapon has been detected;
- an explosive has been detected;
- an un-identified threat has been detected;
- no threat has been detected;
- multiple threats have been detected;
- a lap-top has been detected;
- a complicated image has been detected;
- etc. . . .

Once an image has been assigned a category, the image is then further handled at least in part on the basis of its category.

For example, in the case where an image has been categorized as containing a liquid product, that image may then be considered by a further liquid detection process at step $808_1$, in order to detect the type of liquid that is depicted within the image and/or whether the liquid detected should be considered as a threat. Some suitable processes for determining whether a liquid product constitutes a threat are described, for example, in:

International application PCT/CA2007/001658 filed on Sep. 17, 2007;

International application PCT/CA2009/000811 filed Jun. 9, 2009;

International application PCT/CA2009/000395 filed Mar. 27, 2009; and

International application PCT/CA2009/000401 filed on Mar. 27, 2009.

The contents of the aforementioned documents are incorporated herein by reference.

Once the assessment as to whether the liquid product constitutes a threat has been determined, the image, together with information (textual, audio or other) indicating whether the liquid product was found to constitute a potential threat, may be passed to a one of the screening stations 32 for viewing by an associated human operator. The human operator can then make the determination as to whether the item associated with the image should be marked as "clear" (i.e. no further inspection required) or marked for further inspection (e.g. further manual inspection required). Threat assessment information may be transmitted to a communication device 150 (described above with reference to FIG. 2) associated with one of the screening technicians at the security checkpoint screening station that generated the X-ray image.

In an alternative example, when an image has been categorized as potentially containing a weapon, the image will be handled in a different manner at step $808_2$. For example, the ATD processed image (X-ray image+ATD results) may be forwarded to the next available remote screening station 32 for visual inspection, for example to a human operator specializing in weapons detection. Optionally, the image may be subjected to a materials analysis process at step $808_2$ prior to being displayed for visual inspection at a remote screening station 32, in order to determine whether the image displays any objects that are of a material that is commonly used in weapons.

In yet a further alternative example, an image may be categorized as containing multiple potential threats (for example, both a liquid product and an explosive may be detected). In the case where multiple potential threats are detected within an image, the screening module 26 may cause the image to be handled in yet a different manner. For example, the screening module 26 may cause the image to undergo a series of different steps in order to be able to consider all of the detected threats in a systematic manner. In the case where both a liquid product and an explosive threat are detected by the ATD operation, the screening module 26 may first cause the image to undergo a liquid detection process in order to identify the liquid and/or determine whether the liquid in question is a threat. In the case where the liquid has been determined as unlikely to constitute a threat, the screening module 26 may then cause the image to be displayed for visual inspection at a remote screening station 32 associated with a human operator specializing in explosives. However, in the case where the liquid product is determined as likely to constitute a threat, the screening module 26 may then cause the image to be concurrently (or sequentially) displayed for visual inspection at a screening station 32 associated with a human operator specializing in liquids, and at a remote screening station 32 associated with a human operator specializing explosives.

It should be appreciated that in the case where multiple potential threats are detected, the screening module 26 may handle the image differently depending on:
- the types of the potential threats detected;
- the number of potential threats detected;
- a severity ranking of the different potential threats detected within the image;
- the training of the human operators currently on duty;
- the additional processing operations that are available (i.e. materials detection processing, liquid identification processing, etc. . . . )

These different criteria may be taken into consideration in program logic and instructions that are used by the screening module 26 to process the images being considered.

In yet a further embodiment, in the case where multiple potential threats are detected, the screening module 26 may by-pass visual inspection of the image and automatically cause threat assessment information conveying that the item has be marked for further inspection to be transmitted to one or more on-site screening technicians located nearby the security checkpoint screening station that generated the image.

General Process

Figure 13:
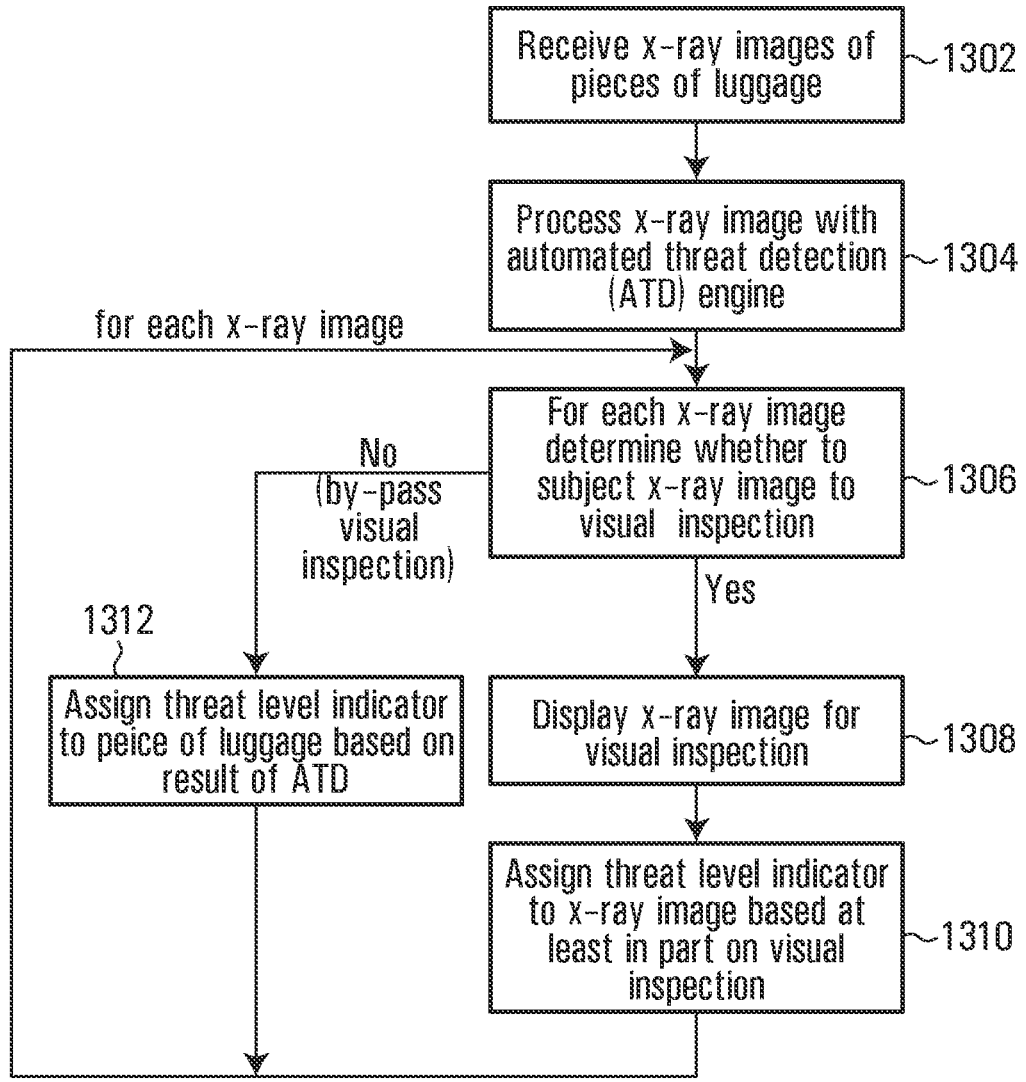
FIG. 13 shows another non-limiting example of a process for processing X-ray images of objects under inspection, such as pieces of luggage, in a security checkpoint screening system of the type depicted in FIG. 1.

FIG. 13 shows a generalized example of a process that can be used to process the X-ray images originating from one of more of the security checkpoint screening stations 12, 14 and 16. It is to be appreciated that the processed described with reference to FIG. 13 may be used in situations where images are pooled from multiple security checkpoint screening stations and are visually inspected remotely from the security checkpoint screening stations or, alternatively, in situations where images originated from a single security checkpoint screening station and are visually inspected either locally or remotely from the security checkpoint screening station.

At step 1302, which is similar to steps 502 described above with reference to FIG. 5, X-ray images derived by scanning the pieces of luggage with X-rays are received.

At step 1304, which is similar to steps 504 described above with reference to FIG. 5, the X-ray images are processed with an automated threat detection engine.

At step 1306, a determination is made as to whether to subject respective ones of the X-ray images to a visual inspection by a human operator at least in part based on results obtained by the automated threat detection engine. Various criteria may be used to make this determination, for example but limited to, the criteria described with reference to FIGS. 6, 7 and 8 described above.

If at step 1306 it is determined that an X-ray image is to be subjected to a visual inspection, the system proceeds to steps 1308 and 1310. Steps 1308 and 1310 are similar to steps 506 and 508 described with reference to FIG. 5. For the purpose of conciseness the description of these steps will not be repeated here.

If step 1306 it is determined that an X-ray image is not to be subjected to a visual inspection, visual inspection the X-ray image is by-passed and the system proceeds to step 1312 where the X-ray image is assigned a threat level indicator based on results obtained by the automated threat detection engine. For example, if the automated threat detection engine detected a threat, then the assigned threat level indicator would convey that the X-ray image has been marked for further inspection. Conversely if the automated threat detection engine has determined that the X-ray image conveyed safe contents, then the assigned threat level indicator would convey that the X-ray image has been marked as clear.

The threat level indicators provided at step 1312 or 1310, along with the X-ray image and optionally a picture image of the item under inspection, are transmitted over the network to an on-site screening technician located at the appropriate security checkpoint screening station that generated the image.

Screening Station—Variant

Figure 12:
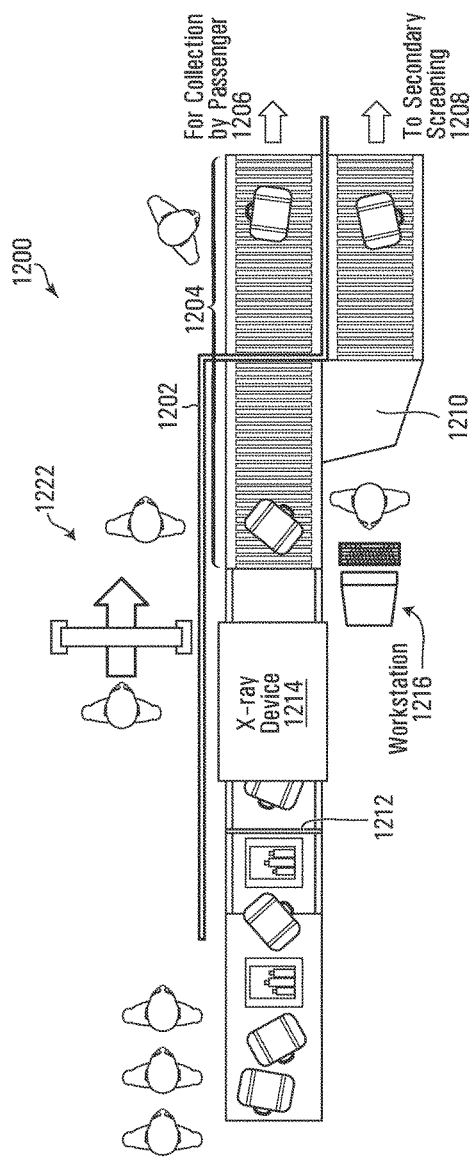
FIG. 12 is a block diagram of a screening station including conveyor system for directing pieces of luggage either to a luggage collection area or to an area for dispatch to secondary screening in accordance with a specific non-limiting example of implementation of the invention.

FIG. 12 is a block diagram of a screening station 1200 in accordance with a variant of the invention. The configuration of screening station 1200 may be used in connection with any one of or all screening stations 12, 14 and 16 shown in FIG. 1.

In the figure, the screening station 1200 includes an X-ray scanning device 1214, a workstation 1216 and post-scan areas 1206 1208. The X-ray scanning device 1214 (which is analogous to scanning device 18) includes a conveyor belt and a scanning area, the conveyor belt carrying pieces of luggage into and out of the scanning areas where the pieces of luggage are exposed to X-rays in order to generated X-ray images of the pieces of luggage. In the specific example depicted, the conveyor belt is extended in order to provide what is in effect a conveyor system in which additional sections of conveyor 1204 have been added, in particular in the post-scan areas 1206 and 1208, in order to control the displacements of the piece of luggage post-scan.

In a non-limiting example of implementation, the workstation 1216 renders an X-ray image of a piece of luggage for visual inspection by a human operator. In such implementation, the workstation 1216 provides a user interface tool enabling the human operator to assign threat level indicators to displayed X-ray images. The workstation 1216 may optionally implement ATD operations to assist in the threat detection process and wherein the ATD operations may also contribute to assigning threat level indicators to X-ray images. Optionally, the visual inspection of X-ray images is performed at least in part at a remote screening station (not shown in FIG. 12) and threat level indicators are sent to the workstation 1216 where they are conveyed to the human operator at workstation 1216.

The screening station 1200 depicted also includes a mechanical device 1212 to separate pieces of luggage (or other objects) at the entrance of the X-ray tunnel; a divider wall 1202 to isolate a portion of the X-ray conveyor from the passengers area 1222, such as to prevent passengers from accessing pieces of luggage until they are marked as clear; and a switching area 1210 to direct pieces of luggage to different post-scan areas 1206 1208 of the screening station 1200. In the example depicted there are two (2) post-scan areas namely a luggage collection area 1206 and an area for dispatch to secondary screening 1208. In the luggage collection area 1206, pieces of luggage marked as clear can be collected by the passengers while in the area for dispatch to secondary screening 1208 pieces of luggage are subjected to further examination, including for example a manual search. It is to be appreciated that alternative implementations of screening stations may include additional post-scan areas without detracting from the spirit of the invention.

In a non-limiting example of implementation, the threat level indicators (which were either entered by the human operator at workstation 1216, which were provide by applying an ATD operation or which were provided by a remote screening station) are used to control a displacement of the pieces of luggage after scanning by the X-ray scanning device 1214.

In a first exemplary implementation, the control of the displacement of the pieces of luggage is exercised manually by an on-site security technician in the switching area 1210. In such implementation, the information which is displayed on workstation 1216 conveys to the on-site security technician that a piece of luggage should be directed to either to the luggage collection area 1206 (when the threat level indicator conveys that the piece of luggage is marked as clear) or to the area for dispatch to secondary screening 1208 (the threat level indicator conveys that the piece of luggage is marked for further inspection). The on-site security technician relies on this information to place the corresponding piece of luggage so that it is displaced towards the proper post-scan area.

Alternatively, in a second exemplary implementation, the control of the displacement of the pieces of luggage is exercised electronically. In such alternative implementation, switching area 1210 includes a control device (which may be part of workstation 1216 or which may be a separate component) programmed to control, based on the threat level indicators, a mechanical switch in the conveyor system for directing the pieces of luggage either to the luggage collection area 1206 (when the threat level indicator conveys that the piece of luggage is marked as clear) or to the area for dispatch to secondary screening 1208 (the threat level indicator conveys that the piece of luggage is marked for further inspection). The control device relies on threat level indicators to control the position of the mechanical switch so that the corresponding pieces of luggage are displaced towards the proper post-scan area. The specific construction of the conveyor system and associated mechanical switch used for directing the flow of the pieces of luggage is not critical to the invention and as such will not be described in further detail here.

Specific Practical Implementation

Figure 9:
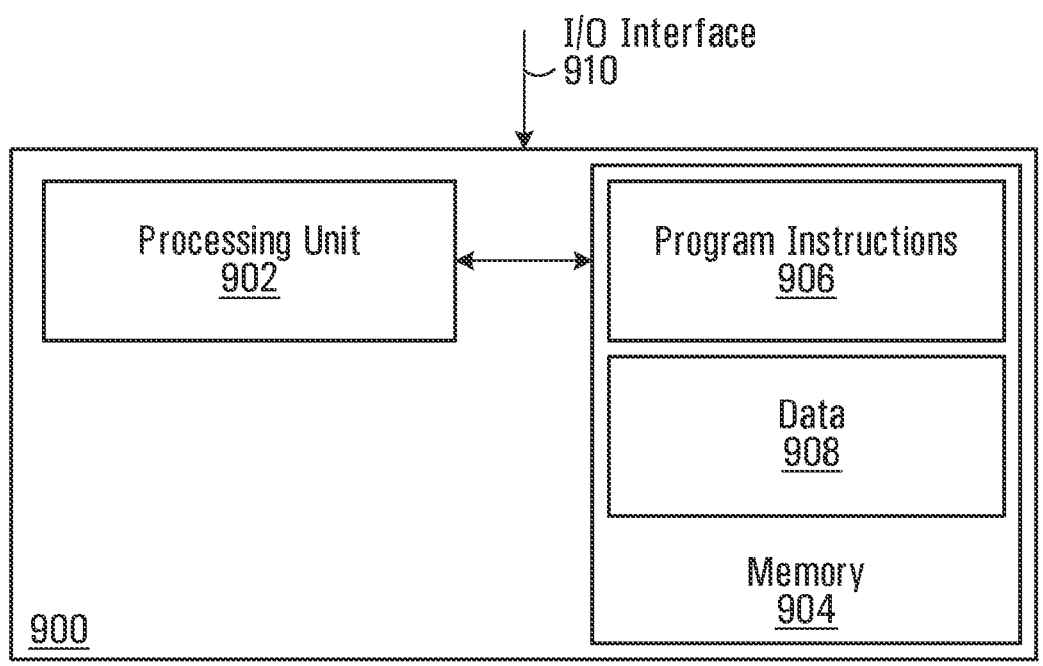
FIG. 9 is a block diagram of a computing apparatus suitable for processing X-ray images of objects under inspection, such as pieces of luggage, in a security checkpoint screening system of the type depicted in FIG. 1 in accordance with a specific non-limiting example of implementation of the invention.

Certain portions of the screening system 10 depicted in FIG. 1, such as for example screening module 26, may be implemented on a general purpose digital computer. FIG. 9 of the drawings shows a simplified representation of a general purpose digital computer 900 on which the screening module 26 may be implemented and which includes a processing unit 902 and a memory 904 connected by a communication bus. The memory 904 stores data 908 and program instructions 906.

The processing unit 902 is adapted to process the data 908 and the program instructions 906 in order to implement the functions described in the specification and depicted in the drawings. The digital computer 1300 may also comprise an I/O interface 910 for receiving or sending data elements to external devices, such as the for receiving information from the centralized repository 22 and transmitting information to one or more remote screening stations 32 and for transmitting threat level indicators to the on-site screening technicians associated with the checkpoint screening stations 18 (all shown in FIG. 1).

Alternatively, the above-described screening module 26 can be implemented on a dedicated hardware platform where electrical/optical components implement the functions described in the specification and depicted in the drawings. Specific implementations may be realized using ICs, ASICs, DSPs, FPGA or other suitable hardware platform.

Figure 10:
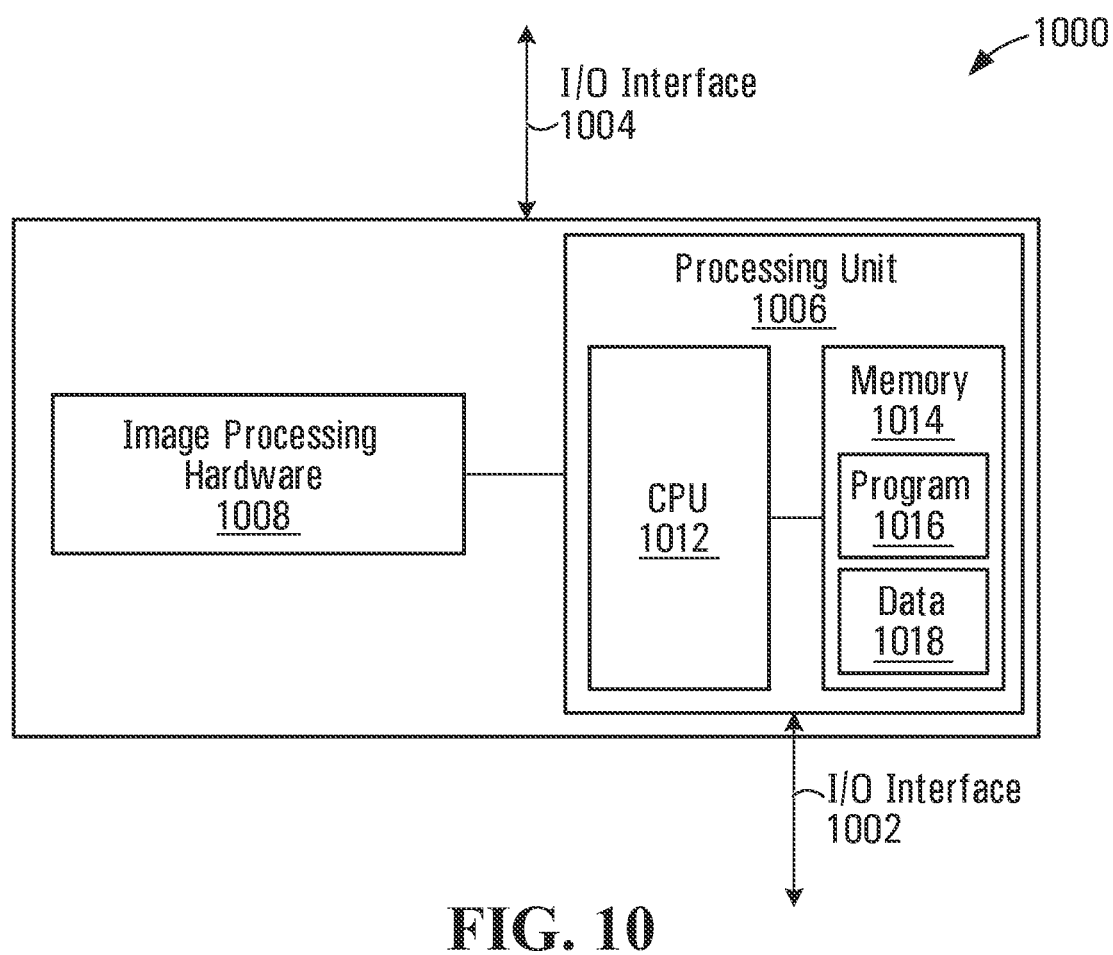
FIG. 10 is a block diagram of a computing apparatus suitable for processing X-ray images of objects under inspection, such as pieces of luggage, in a security checkpoint screening system of the type depicted in FIG. 1 in accordance with an alternative specific example of implementation of the invention.

Other alternative implementations of the screening module 26 can be implemented as a combination of dedicated hardware and software, of the type depicted in FIG. 10 and generally designated by reference numeral 1000. Such an implementation comprises a dedicated image processing hardware module 1008 (which could form part of the ATD 28) and a general purpose computing unit 1006 including a CPU 1012 and a memory 1014 connected by a communication bus. The memory 1014 stores data 1018 and program instructions 1016. The CPU 1012 is adapted to process the data 1018 and the program instructions 1016 in order to implement the functions described in the specification and depicted in the drawings. As depicted, this specific implementation also comprise one or more I/O interfaces 1004 1002 for receiving or sending data elements to external devices such as for receiving information from the centralized repository 22 and for transmitting information to one or more remote screening stations 32 and for transmitting threat assessment information to on-site screening technicians associated with the security checkpoint screening stations 18 (all shown in FIG. 1).

It will be noted that the security screening system 10 depicted in FIG. 1 is of a distributed nature where the X-ray images are obtained by a scanning device 18 at one of the security screening stations 12, 14, 16 and transmitted over a network to the centralized repository 22 and the screening module 26 described above. The screening module 26 in turn transmits threat assessment information to one or more display devices 150 or portable hand-held devices associated with on-site screening technicians to display information, such as a message indicating that a given item should be subjected to further manual inspection. Such a message may include an X-ray image of a piece of luggage under inspection. The display device 150 may be located in the same location where the X-ray images of items under inspection were obtained or in an alternate location.

Figure 11:
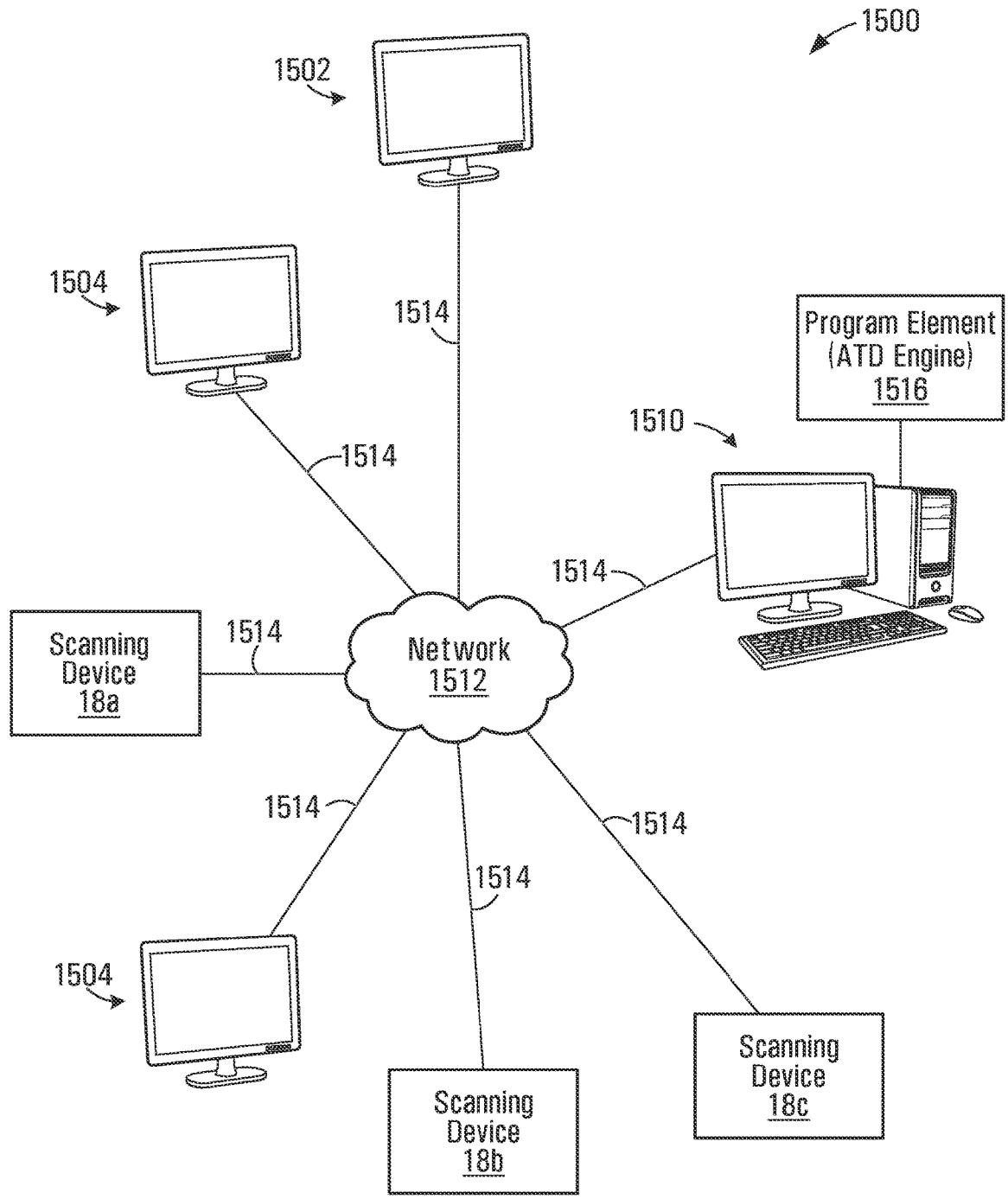
FIG. 11 shows a functional block diagram of a distributed processing system including networked components for implementing a security checkpoint screening system in accordance with a specific non-limiting example of implementation of the invention.

FIG. 11 illustrates a non-limiting network-based system 1500 for screening items in accordance with a specific example of implementation of the invention. The system 1500 includes a plurality of computing devices 1502, 1504 and 1506 (which could be the display devices 150 and/or the handheld portable devices held by the on-site screening technicians and/or the remote screening stations 32), scanning devices 18a 18b and 18c (which are each associated with a respective security checkpoint screening station 12, 14, 16) connected through network 1512 to a computer system 1510. The communication links 1514 between the computing devices 1502, 1504, 1506, the inspections devices 18a 18b and 18c and the computer system 1510 can be metallic conductors, optical fibers or wireless, without departing from the spirit of the invention. The network 1512 may be any suitable network including but not limited to a global public network such as the Internet, a private network and a wireless network. In accordance with a non-limiting example, the network is a dedicated 1 Gb/s network. The computer system 1510 is adapted to process information received from the inspections devices 18a 18b and 18c and issue signals conveying image results to the human screeners 32 at one or more of the computing devices 1502, 1504, 1506 and issue threat assessment information to other ones of the computing devices using suitable methods known in the computer related arts.

The computer system 1510 includes a program element 1516 for execution by a CPU (not shown). In a non-limiting example, the program element 1516 includes functionality to implement the functionality of screening module 26 and optionally the functionality of the monitoring module 24 described above. The computer system 1510 may also include a computer readable storage medium (not shown) for storing the centralized repository 22.

Program element 1516 also includes the necessary networking functionality to allow the computer system 1510 to communicate with the computing devices 1502, 1504, 1506, 1508 and scanning devices 18 over network 1512. In a specific implementation, the computing devices 1502, 1504, 1506 include display devices responsive to signals received from the server system 1510 for displaying screening results derived by the server system 1510.

Although the above embodiments have been described with reference to a scanning device 18 (shows in FIG. 1) embodied in a single view X-ray imaging apparatus, it is to be appreciated that embodiments of the invention may be used in connection with any suitable type of inspection device including multi-view X-ray imaging apparatus, as well as the cameras 20.

It will therefore be appreciated that other various modifications will become apparent to those skilled in the art and are within the scope of this invention, which is defined more particularly by the attached claims.

The invention claimed is:

1. A security checkpoint screening system comprising:
   a) a checkpoint screening station having:
      i) a scanning area including a scanning device for scanning items with penetrating radiation to derive image data, the image data conveying images of the items;
      ii) a pre-scan area lying before the scanning area;
      iii) at least two post-scan areas, the at least two post scan areas including an item collection area and an area for dispatch to secondary screening;
      iv) a switching area to direct the items to different post-scan areas of the at least two post-scan areas;
      v) a conveyor system including mechanical switches in the switching area of the checkpoint screening station for controlling a displacement of the items through the security checkpoint screening system, wherein the conveyor system includes respective conveyor sections in the item collection area and in the area for dispatch to secondary screening, said conveyor sections in the item collection area and in the area for dispatch to secondary screening being positioned alongside one another;

vi) a divider wall to isolate a portion of the conveyor system to prevent access to items being displaced by the conveyor system until the items have been marked as clear and have reached the item collection area;

b) a processor in communication with the scanning device, the processor being programmed with software for:

vii) receiving image data derived by scanning the items with the scanning device using penetrating radiation, the image data conveying images of the items;

viii) assigning threat level indicators to items associated with the images conveyed by the image data at least in part based:

(1) on automated threat detection results obtained by processing the image data with an image processing module programmed to detect potential threats in images; and/or (2) on threat assessment information provided by a human operator at an operator screening station located remotely from the checkpoint screening station;

c) a control device programmed for electronically controlling a displacement of the items through the security checkpoint screening system by using the assigned threat level indicators to control the mechanical switch of the conveyor system in the switching area of the checkpoint screening station so that corresponding items are directed to a proper one of the at least two post-scan areas.

2. A security checkpoint screening system as defined in claim 1, said processor is programmed with software for displaying at least some of the images conveyed by the image data at the operator screening station located remotely from the checkpoint screening station so that visual inspection of the at least some of the images may be performed.

3. A security checkpoint screening system as defined in claim 2, wherein said processor is programmed with software for processing the automated threat detection results to identify at least some images conveyed by the image data as candidates for by-passing visual inspection by the human operator at the operator screening station located remotely from the checkpoint screening station.

4. A security checkpoint screening system as defined in claim 3, wherein at least one of the images is identified as a candidate image for by-passing visual inspection when the information derived by the automated threat detection results conveys an indication of safe contents in connection with the at least one of the images.

5. A security checkpoint screening system as defined in claim 3, wherein assigning threat level indicators to items includes assigning some threat level indicators based on automated threat detection results by-passing any visual inspection by the human operator at the operator screening station located remotely from the checkpoint screening station.

6. A security checkpoint screening system as defined in claim 1, wherein said processor is programmed for processing images conveyed by the image data with the image processing module to derive the automated threat detection results.

7. A security checkpoint screening system as defined in claim 1, wherein the assigning of the threat level indicators to items associated with images conveyed by the image data is performed at least in part by processing one of:

a) automated threat detection results and threat assessment information threat assessment information provided by the human operator at the operator screening station located remotely from the checkpoint screening station as a result of a visual inspection of the images; and b) automated threat detection results associated with images conveyed by the image data by-passing any visual inspection of the images by the human operator at the operator screening station located remotely from the checkpoint screening station.

8. A security checkpoint screening system as defined in claim 1, wherein said processor is programmed with software for displaying information derived at least in part based on the threat level indicators on devices associated with an on-site screening technician located in proximity to the checkpoint screening station.

9. A security checkpoint screening system as defined in claim 1, wherein the items being screened at the security checkpoint include pieces of luggage.

10. A security checkpoint screening system as defined in claim 1, wherein the scanning device is an X-ray scanning device and wherein the image data includes X-ray image data.

* * * * *